(12) United States Patent
Raghuram et al.

(10) Patent No.: US 10,609,750 B2
(45) Date of Patent: Mar. 31, 2020

(54) DEVICES AND METHODS FOR NEXT GENERATION TECHNOLOGY INDICATORS

(71) Applicant: Intel Corporation, Santa Clara, CA (US)

(72) Inventors: Sharada Raghuram, Buffalo Grove, IL (US); Jerome Parron, Fuerth (DE); Kumaran Subramanian, Oberasbach (DE)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/053,926

(22) Filed: Aug. 3, 2018

(65) Prior Publication Data

US 2020/0045762 A1 Feb. 6, 2020

(51) Int. Cl.
| | |
|---|---|
| *H04W 76/16* | (2018.01) |
| *H04W 76/27* | (2018.01) |
| *H04W 88/02* | (2009.01) |
| *H04W 88/06* | (2009.01) |
| *H04W 76/30* | (2018.01) |
| *H04W 76/15* | (2018.01) |
| *H04W 72/04* | (2009.01) |

(52) U.S. Cl.
CPC ........... *H04W 76/16* (2018.02); *H04W 76/15* (2018.02); *H04W 76/27* (2018.02); *H04W 76/30* (2018.02); *H04W 88/023* (2013.01); *H04W 88/06* (2013.01); *H04W 72/042* (2013.01)

(58) Field of Classification Search
CPC ..... H04W 76/16; H04W 76/30; H04W 88/06; H04W 76/27; H04W 88/023; H04W 72/042; H04W 76/15
See application file for complete search history.

(56) References Cited

U.S. PATENT DOCUMENTS

| | | | |
|---|---|---|---|
| 2015/0117357 A1* | 4/2015 | Ozturk | H04W 28/0205 370/329 |
| 2015/0146599 A1* | 5/2015 | Jha | H04L 5/0032 370/311 |
| 2018/0368016 A1* | 12/2018 | Lee | H04W 24/10 |
| 2019/0053136 A1* | 2/2019 | Lee | H04L 1/1614 |
| 2019/0053292 A1* | 2/2019 | Ali | H04W 72/0426 |

\* cited by examiner

*Primary Examiner* — Nam T Huynh

(57) ABSTRACT

Devices and methods for enabling the reporting of technology indicators to a user operating on an LTE-NR Dual Connectivity mode. This may include establishing a first network access link with a primary network access node and a second network access link with a secondary network access node; identifying a first Radio Access Technology (RAT) corresponding to the first network access link and a second RAT corresponding to the second network access link; determining a first RAT Radio Link Control (RLC) leg for the first RAT and a second RAT RLC leg for the second RAT; and reporting at least the second RAT based on the determined second RAT RLC leg.

19 Claims, 14 Drawing Sheets

FIG. 9
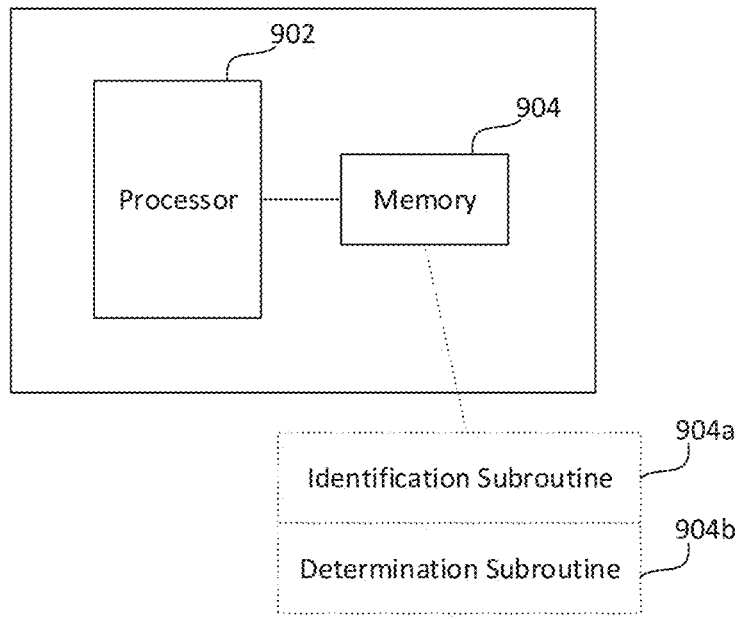
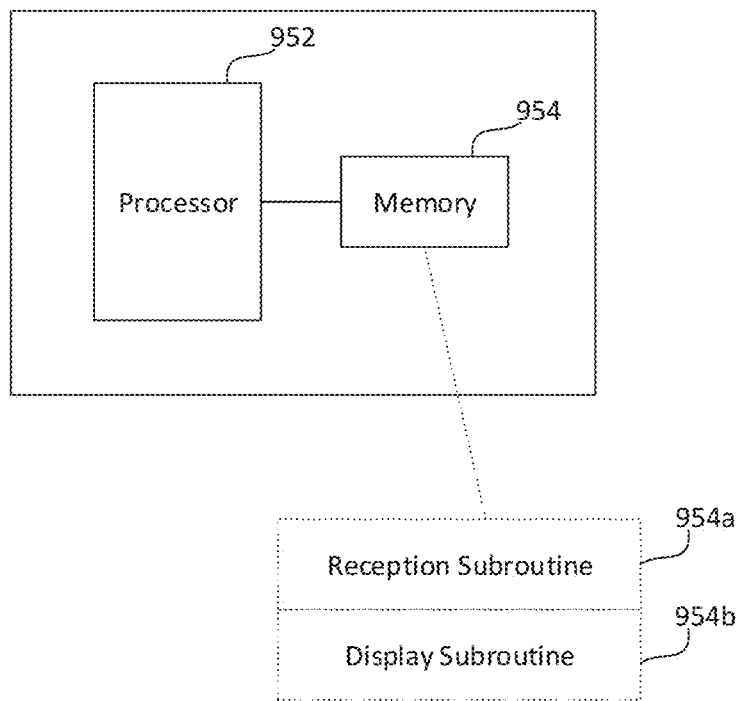

US 10,609,750 B2

DEVICES AND METHODS FOR NEXT GENERATION TECHNOLOGY INDICATORS

TECHNICAL FIELD

Various embodiments relate generally to wireless communications.

BACKGROUND

Release 15 of the Third Generation Partnership Project (3GPP) introduced schemes for 5G deployment to compliment 4G, commonly referred to as Long Term Evolution (LTE). Among the architectural options available in 3GPP for 5G deployment include those based on an LTE and New Radio (NR, i.e. 5G) dual connectivity. Some of these options are referred to as E-UTRAN New Radio Dual Connectivity (EN-DC), NG-RAN E-UTRA-NR Dual Connectivity (NGEN-DC), and NR-E-UTRA Dual Connectivity (NE-DC). In these modes, a Data Radio Bearer (DRB) can be configured so that data is transmitted through the LTE leg, through the NR leg, or through both. However, in these dual connectivity modes, current methods and devices are only configured to indicate a current Radio Access Technology (RAT) on which a terminal device is camped on, which may not properly inform the user of the availability of 5G resources when camped on an LTE cell.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which:

FIG. 9 shows an exemplary internal configuration of controller according to some aspects;

DESCRIPTION

Figure 1:
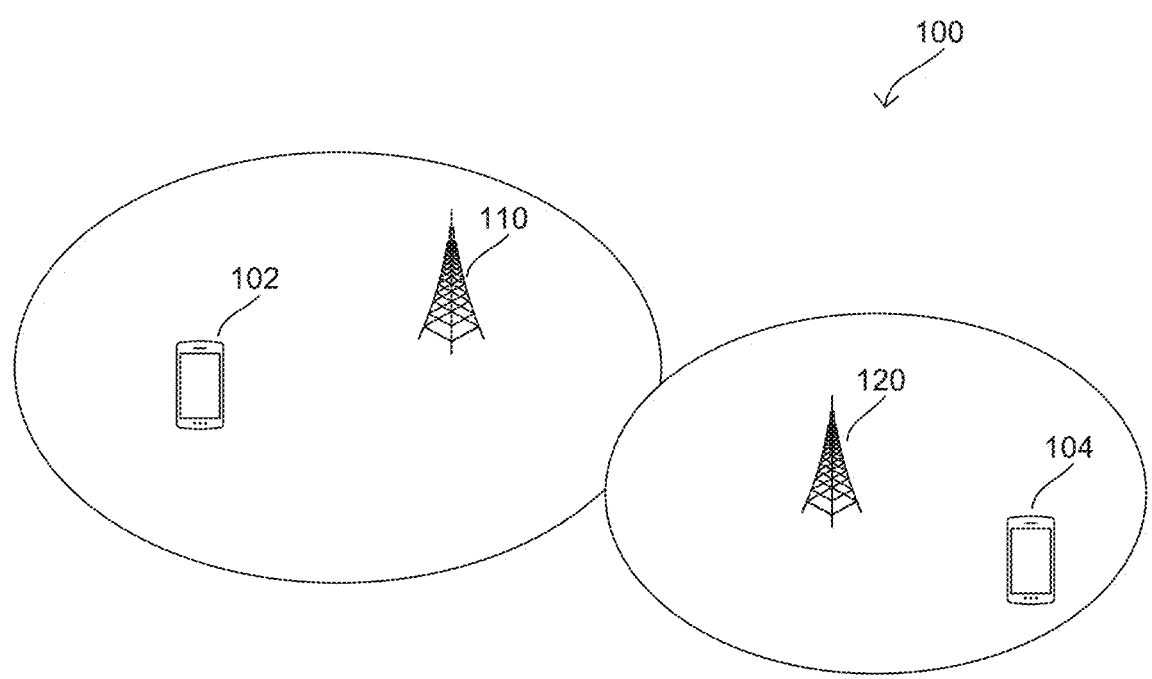
FIG. 1 shows an exemplary radio communication network according to some aspects.

The following detailed description refers to the accompanying drawings that show, by way of illustration, specific details and embodiments in which the invention may be practiced.

The word "exemplary" is used herein to mean "serving as an example, instance, or illustration". Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e. one or more. Any term expressed in plural form that does not expressly state "plurality" or "multiple" likewise refers to a quantity equal to or greater than one. The terms "proper subset", "reduced subset", and "lesser subset" refer to a subset of a set that is not equal to the set, i.e. a subset of a set that contains less elements than the set.

Any vector and/or matrix notation utilized herein is exemplary in nature and is employed solely for purposes of explanation. Accordingly, aspects of this disclosure accompanied by vector and/or matrix notation are not limited to being implemented solely using vectors and/or matrices, and that the associated processes and computations may be equivalently performed with respect to sets, sequences, groups, etc., of data, observations, information, signals, samples, symbols, elements, etc.

As used herein, "memory" are understood as a non-transitory computer-readable medium in which data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof Furthermore, registers, shift registers, processor registers, data buffers, etc., are also embraced herein by the term memory. A single component referred to as "memory" or "a memory" may be composed of more than one different type of memory, and thus may refer to a collective component comprising one or more types of memory. Any single memory component may be separated into multiple collectively equivalent memory components, and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

The term "terminal device" utilized herein refers to user-side devices (both portable and fixed) that can connect to a core network and/or external data networks via a radio access network. "Terminal device" can include any mobile or immobile wireless communication device, including User Equipment (UEs), Mobile Stations (MSs), Stations (STAs), cellular phones, tablets, laptops, personal computers, wearables, multimedia playback and other handheld or body-mounted electronic devices, consumer/home/office/commercial appliances, vehicles, and any other electronic device capable of user-side wireless communications. Without loss of generality, in some cases terminal devices can also include application-layer components, such as application processors or other general processing components that are directed to functionality other than wireless communications. Terminal devices can optionally support wired communications in addition to wireless communications. Furthermore, terminal devices can include vehicular communication devices that function as terminal devices.

The term "network access node" as utilized herein refers to a network-side device that provides a radio access network with which terminal devices can connect and exchange information with a core network and/or external data networks through the network access node. "Network access nodes" can include any type of base station or access point, including macro base stations, micro base stations, NodeBs, evolved NodeBs (eNBs), Home base stations, Remote Radio Heads (RRHs), relay points, Wi-Fi/WLAN Access Points (APs), Bluetooth master devices, DSRC RSUs, terminal devices acting as network access nodes, and any other electronic device capable of network-side wireless communications, including both immobile and mobile devices (e.g., vehicular network access nodes, moving cells, and other movable network access nodes). As used herein, a "cell" in the context of telecommunications may be understood as a sector served by a network access node. Accordingly, a cell may be a set of geographically co-located antennas that correspond to a particular sector of a network access node. A network access node can thus serve one or more cells (or sectors), where the cells are characterized by distinct communication channels. Furthermore, the term "cell" may be utilized to refer to any of a macrocell, microcell, femtocell, picocell, etc. Certain communication devices can act as both terminal devices and network access nodes, such as a terminal device that provides network connectivity for other terminal devices.

Various aspects of this disclosure may utilize or be related to radio communication technologies. While some examples may refer to specific radio communication technologies, the examples provided herein may be similarly applied to various other radio communication technologies, both existing and not yet formulated, particularly in cases where such radio communication technologies share similar features as disclosed regarding the following examples. Various exemplary radio communication technologies that the aspects described herein may utilize include, but are not limited to: a Global System for Mobile Communications (GSM) radio communication technology, a General Packet Radio Service (GPRS) radio communication technology, an Enhanced Data Rates for GSM Evolution (EDGE) radio communication technology, and/or a Third Generation Partnership Project (3GPP) radio communication technology, for example Universal Mobile Telecommunications System (UMTS), Freedom of Multimedia Access (FOMA), 3GPP Long Term Evolution (LTE), 3GPP Long Term Evolution Advanced (LTE Advanced), Code division multiple access 2000 (CDMA2000), Cellular Digital Packet Data (CDPD), Mobitex, Third Generation (3G), Circuit Switched Data (CSD), High-Speed Circuit-Switched Data (HSCSD), Universal Mobile Telecommunications System (Third Generation) (UMTS (3G)), Wideband Code Division Multiple Access (Universal Mobile Telecommunications System) (W-CDMA (UMTS)), High Speed Packet Access (HSPA), High-Speed Downlink Packet Access (HSDPA), High-Speed Uplink Packet Access (HSUPA), High Speed Packet Access Plus (HSPA+), Universal Mobile Telecommunications System-Time-Division Duplex (UMTS-TDD), Time Division-Code Division Multiple Access (TD-CDMA), Time Division-Synchronous Code Division Multiple Access (TD-CDMA), 3rd Generation Partnership Project Release 8 (Pre-4th Generation) (3GPP Rel. 8 (Pre-4G)), 3GPP Rel. 9 (3rd Generation Partnership Project Release 9), 3GPP Rel. 10 (3rd Generation Partnership Project Release 10), 3GPP Rel. 11 (3rd Generation Partnership Project Release 11), 3GPP Rel. 12 (3rd Generation Partnership Project Release 12), 3GPP Rel. 13 (3rd Generation Partnership Project Release 13), 3GPP Rel. 14 (3rd Generation Partnership Project Release 14), 3GPP Rel. 15 (3rd Generation Partnership Project Release 15), 3GPP Rel. 16 (3rd Generation Partnership Project Release 16), 3GPP Rel. 17 (3rd Generation Partnership Project Release 17), 3GPP Rel. 18 (3rd Generation Partnership Project Release 18), 3GPP 5G, 3GPP LTE Extra, LTE-Advanced Pro, LTE Licensed-Assisted Access (LAA), MuLTEfire, UMTS Terrestrial Radio Access (UTRA), Evolved UMTS Terrestrial Radio Access (E-UTRA), Long Term Evolution Advanced (4th Generation) (LTE Advanced (4G)), cdmaOne (2G), Code division multiple access 2000 (Third generation) (CDMA2000 (3G)), Evolution-Data Optimized or Evolution-Data Only (EV-DO), Advanced Mobile Phone System (1st Generation) (AMPS (1G)), Total Access Communication arrangement/Extended Total Access Communication arrangement (TACS/ETACS), Digital AMPS (2nd Generation) (D-AMPS (2G)), Push-to-talk (PTT), Mobile Telephone System (MTS), Improved Mobile Telephone System (IMTS), Advanced Mobile Telephone System (AMTS), OLT (Norwegian for Offentlig Landmobil Telefoni, Public Land Mobile Telephony), MTD (Swedish abbreviation for Mobiltelefonisystem D, or Mobile telephony system D), Public Automated Land Mobile (Autotel/PALM), ARP (Finnish for Autoradiopuhelin, "car radio phone"), NMT (Nordic Mobile Telephony), High capacity version of NTT (Nippon Telegraph and Telephone) (Hicap), Cellular Digital Packet Data (CDPD), Mobitex, DataTAC, Integrated Digital Enhanced Network (iDEN), Personal Digital Cellular (PDC), Circuit Switched Data (CSD), Personal Handyphone System (PHS), Wideband Integrated Digital Enhanced Network (WiDEN), iBurst, Unlicensed Mobile Access (UMA), also referred to as also referred to as 3GPP Generic Access Network, or GAN standard), Zigbee, Bluetooth®, Wireless Gigabit Alliance (WiGig) standard, mmWave standards in general (wireless systems operating at 10-300 GHz and above such as WiGig, IEEE 802.11ad, IEEE 802.11ay, etc.), technologies operating above 300 GHz and THz bands, (3GPP/LTE based or IEEE 802.11p and other) Vehicle-to-Vehicle (V2V) and Vehicle-to-X (V2X) and Vehicle-to-Infrastructure (V2I) and Infrastructure-to-Vehicle (I2V) communication technologies, 3GPP cellular V2X, DSRC (Dedicated Short Range Communications) communication arrangements such as Intelligent-Transport-Systems, and other existing, developing, or future radio communication technologies. As used herein, a first radio communication technology may be different from a second radio communication technology if the first and second radio communication technologies are based on different communication standards.

Aspects described herein may use such radio communication technologies according to various spectrum management schemes, including, but not limited to, dedicated licensed spectrum, unlicensed spectrum, (licensed) shared spectrum (such as LSA, "Licensed Shared Access," in 2.3-2.4 GHz, 3.4-3.6 GHz, 3.6-3.8 GHz and further frequencies and SAS, "Spectrum Access System," in 3.55-3.7 GHz and further frequencies), and may be use various spectrum bands including, but not limited to, IMT (International Mobile Telecommunications) spectrum (including 450-470 MHz, 790-960 MHz, 1710-2025 MHz, 2110-2200 MHz, 2300-2400 MHz, 2500-2690 MHz, 698-790 MHz, 610-790 MHz, 3400-3600 MHz, etc., where some bands may be limited to specific region(s) and/or countries), IMT-advanced spectrum, IMT-2020 spectrum (expected to include 3600-3800 MHz, 3.5 GHz bands, 700 MHz bands, bands within the 24.25-86 GHz range, etc.), spectrum made available under FCC's "Spectrum Frontier" 5G initiative (including 27.5-28.35 GHz, 29.1-29.25 GHz, 31-31.3 GHz, 37-38.6 GHz, 38.6-40 GHz, 42-42.5 GHz, 57-64 GHz, 64-71 GHz, 71-76 GHz, 81-86 GHz and 92-94 GHz, etc.), the ITS (Intelligent Transport Systems) band of 5.9 GHz (typically 5.85-5.925 GHz) and 63-64 GHz, bands currently allocated to WiGig such as WiGig Band 1 (57.24-59.40 GHz), WiGig Band 2 (59.40-61.56 GHz) and WiGig Band 3 (61.56-63.72 GHz) and WiGig Band 4 (63.72-65.88 GHz), the 70.2 GHz-71 GHz band, any band between 65.88 GHz and 71 GHz, bands currently allocated to automotive radar applications such as 76-81 GHz, and future bands including 94-300 GHz and above. Furthermore, aspects described herein can also employ radio communication technologies on a secondary basis on bands such as the TV White Space bands (typically below 790 MHz) where in particular the 400 MHz and 700 MHz bands are prospective candidates. Besides cellular applications, specific applications for vertical markets may be addressed such as PMSE (Program Making and Special Events), medical, health, surgery, automotive, low-latency, drones, etc. applications. Furthermore, aspects described herein may also use radio communication technologies with a hierarchical application, such as by introducing a hierarchical prioritization of usage for different types of users (e.g., low/medium/high priority, etc.), based on a prioritized access to the spectrum e.g., with highest priority to tier-1 users, followed by tier-2, then tier-3, etc. users, etc. Aspects described herein can also use radio communication technologies with different Single Carrier or OFDM flavors (CP-OFDM, SC-FDMA, SC-OFDM, filter bank-based multicarrier (FBMC), OFDMA, etc.) and in particular 3GPP NR (New Radio), which can include allocating the OFDM carrier data bit vectors to the corresponding symbol resources.

For purposes of this disclosure, radio communication technologies may be classified as one of a Short Range radio communication technology or Cellular Wide Area radio communication technology. Short Range radio communication technologies may include Bluetooth, WLAN (e.g., according to any IEEE 802.11 standard), and other similar radio communication technologies. Cellular Wide Area radio communication technologies may include Global System for Mobile Communications (GSM), Code Division Multiple Access 2000 (CDMA2000), Universal Mobile Telecommunications System (UMTS), Long Term Evolution (LTE), General Packet Radio Service (GPRS), Evolution-Data Optimized (EV-DO), Enhanced Data Rates for GSM Evolution (EDGE), High Speed Packet Access (HSPA; including High Speed Downlink Packet Access (HSDPA), High Speed Uplink Packet Access (HSUPA), HSDPA Plus (HSDPA+), and HSUPA Plus (HSUPA+)), Worldwide Interoperability for Microwave Access (WiMax) (e.g., according to an IEEE 802.16 radio communication standard, e.g., WiMax fixed or WiMax mobile), etc., and other similar radio communication technologies. Cellular Wide Area radio communication technologies also include "small cells" of such technologies, such as microcells, femtocells, and picocells. Cellular Wide Area radio communication technologies may be generally referred to herein as "cellular" communication technologies.

For purposes of this disclosure, the term "5G" refers to wireless technologies as provided by the 3GPP and International Telecommunication Union (ITU) standards. This may include spectral use overlapping with the existing LTE frequency range (e.g. 600 MHz to 6 GHz) and also include spectral use in the millimeter wave bands (e.g. 24-86 GHz). Also, the terms 5G, New Radio (NR), or 5G NR may be used interchangeably.

The terms "radio communication network" and "wireless network" as utilized herein encompasses both an access section of a network (e.g., a radio access network (RAN) section) and a core section of a network (e.g., a core network section). The term "radio idle mode" or "radio idle state" used herein in reference to a terminal device refers to a radio control state in which the terminal device is not allocated at least one dedicated communication channel of a mobile communication network. The term "radio connected mode" or "radio connected state" used in reference to a terminal device refers to a radio control state in which the terminal device is allocated at least one dedicated uplink communication channel of a radio communication network.

Unless explicitly specified, the term "transmit" encompasses both direct (point-to-point) and indirect transmission (via one or more intermediary points). Similarly, the term "receive" encompasses both direct and indirect reception. Furthermore, the terms "transmit", "receive", "communicate", and other similar terms encompass both physical transmission (e.g., the transmission of radio signals) and logical transmission (e.g., the transmission of digital data over a logical software-level connection). For example, a processor or controller may transmit or receive data over a software-level connection with another processor or controller in the form of radio signals, where the physical transmission and reception is handled by radio-layer components such as RF transceivers and antennas, and the logical transmission and reception over the software-level connection is performed by the processors or controllers. The term "communicate" encompasses one or both of transmitting and receiving, i.e. unidirectional or bidirectional communication in one or both of the incoming and outgoing directions. The term "calculate" encompass both 'direct' calculations via a mathematical expression/formula/relationship and 'indirect' calculations via lookup or hash tables and other array indexing or searching operations.

Figure 2:
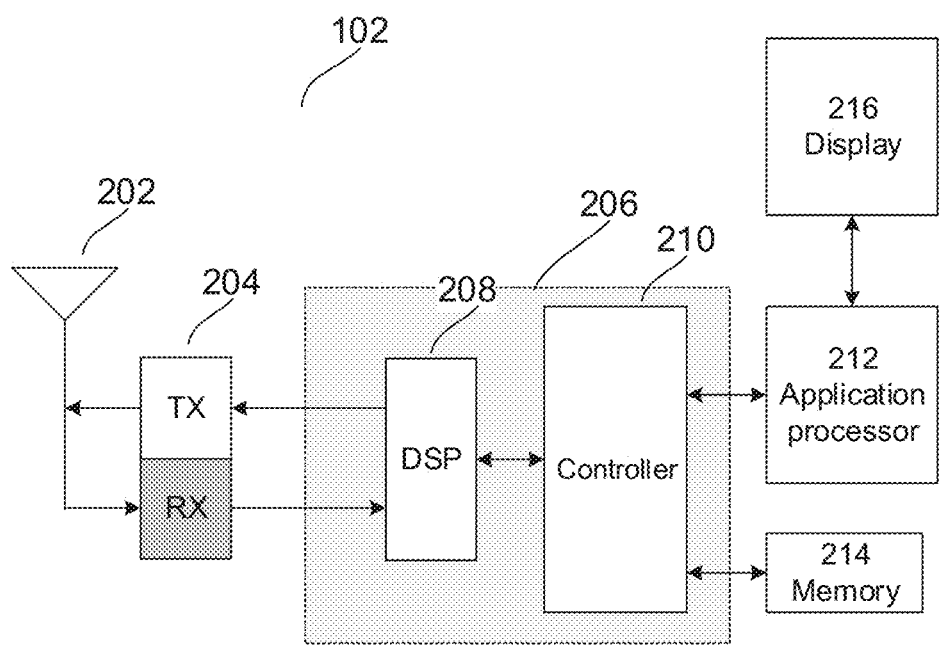
FIG. 2 shows an internal configuration of terminal device according to some aspects.

FIGS. 1 and 2 depict an exemplary network and device architecture for wireless communications. In particular, FIG. 1 shows exemplary radio communication network 100 according to some aspects, which may include terminal devices 102 and 104 and network access nodes 110 and 120. Radio communication network 100 may communicate with terminal devices 102 and 104 via network access nodes 110 and 120 over a radio access network. Although certain examples described herein may refer to a particular radio access network context (e.g., LTE, UMTS, GSM, other 3rd Generation Partnership Project (3GPP) networks, WLAN/WiFi, Bluetooth, 5G, mmWave, etc.), these examples are demonstrative and may therefore be readily applied to any other type or configuration of radio access network. The number of network access nodes and terminal devices in radio communication network 100 is exemplary and is scalable to any amount.

In an exemplary cellular context, network access nodes 110 and 120 may be base stations (e.g., eNodeBs, NodeBs, Base Transceiver Stations (BTSs), or any other type of base station), while terminal devices 102 and 104 may be cellular terminal devices (e.g., Mobile Stations (MSs), User Equipments (UEs), or any type of cellular terminal device). Network access nodes 110 and 120 may therefore interface (e.g., via backhaul interfaces) with a cellular core network such as an Evolved Packet Core (EPC, for LTE), Core Network (CN, for UMTS), or other cellular core networks, which may also be considered part of radio communication network 100. The cellular core network may interface with one or more external data networks. In an exemplary short-range context, network access node 110 and 120 may be access points (APs, e.g., WLAN or WiFi APs), while terminal device 102 and 104 may be short range terminal devices (e.g., stations (STAs)). Network access nodes 110 and 120 may interface (e.g., via an internal or external router) with one or more external data networks.

Network access nodes 110 and 120 (and, optionally, other network access nodes of radio communication network 100 not explicitly shown in FIG. 1) may accordingly provide a radio access network to terminal devices 102 and 104 (and, optionally, other terminal devices of radio communication network 100 not explicitly shown in FIG. 1). In an exemplary cellular context, the radio access network provided by network access nodes 110 and 120 may enable terminal devices 102 and 104 to wirelessly access the core network via radio communications. The core network may provide switching, routing, and transmission, for traffic data related to terminal devices 102 and 104, and may further provide access to various internal data networks (e.g., control nodes, routing nodes that transfer information between other terminal devices on radio communication network 100, etc.) and external data networks (e.g., data networks providing voice, text, multimedia (audio, video, image), and other Internet and application data). In an exemplary short-range context, the radio access network provided by network access nodes 110 and 120 may provide access to internal data networks (e.g., for transferring data between terminal devices connected to radio communication network 100) and external data networks (e.g., data networks providing voice, text, multimedia (audio, video, image), and other Internet and application data).

The radio access network and core network (if applicable, such as for a cellular context) of radio communication network 100 may be governed by communication protocols that can vary depending on the specifics of radio communication network 100. Such communication protocols may define the scheduling, formatting, and routing of both user and control data traffic through radio communication network 100, which includes the transmission and reception of such data through both the radio access and core network domains of radio communication network 100. Accordingly, terminal devices 102 and 104 and network access nodes 110 and 120 may follow the defined communication protocols to transmit and receive data over the radio access network domain of radio communication network 100, while the core network may follow the defined communication protocols to route data within and outside of the core network. Exemplary communication protocols include LTE, UMTS, GSM, WiMAX, Bluetooth, WiFi, mmWave, etc., any of which may be applicable to radio communication network 100.

FIG. 2 shows an internal configuration of terminal device 102 according to some aspects, which may include antenna system 202, radio frequency (RF) transceiver 204, baseband modem 206 (including digital signal processor 208 and protocol controller 210), application processor 212, and memory 214. Although not explicitly shown in FIG. 2, in some aspects terminal device 102 may include one or more additional hardware and/or software components, such as processors/microprocessors, controllers/microcontrollers, other specialty or generic hardware/processors/circuits, peripheral device(s), memory, power supply, external device interface(s), subscriber identity module(s) (SIMs), user input/output devices (display(s), keypad(s), touchscreen(s), speaker(s), external button(s), camera(s), microphone(s), etc.), or other related components.

Terminal device 102 may transmit and receive radio signals on one or more radio access networks. Baseband modem 206 may direct such communication functionality of terminal device 102 according to the communication protocols associated with each radio access network, and may execute control over antenna system 202 and RF transceiver 204 to transmit and receive radio signals according to the formatting and scheduling parameters defined by each communication protocol. Although various practical designs may include separate communication components for each supported radio communication technology (e.g., a separate antenna, RF transceiver, digital signal processor, and controller), for purposes of conciseness the configuration of terminal device 102 shown in FIG. 2 depicts only a single instance of such components.

Terminal device 102 may transmit and receive wireless signals with antenna system 202, which may be a single antenna or an antenna array that includes multiple antennas. In some aspects, antenna system 202 may additionally include analog antenna combination and/or beamforming circuitry. In the receive (RX) path, RF transceiver 204 may receive analog radio frequency signals from antenna system 202 and perform analog and digital RF front-end processing on the analog radio frequency signals to produce digital baseband samples (e.g., In-Phase/Quadrature (IQ) samples) to provide to baseband modem 206. RF transceiver 204 may include analog and digital reception components including amplifiers (e.g., Low Noise Amplifiers (LNAs)), filters, RF demodulators (e.g., RF IQ demodulators)), and analog-to-digital converters (ADCs), which RF transceiver 204 may utilize to convert the received radio frequency signals to digital baseband samples. In the transmit (TX) path, RF transceiver 204 may receive digital baseband samples from baseband modem 206 and perform analog and digital RF front-end processing on the digital baseband samples to produce analog radio frequency signals to provide to antenna system 202 for wireless transmission. RF transceiver 204 may thus include analog and digital transmission components including amplifiers (e.g., Power Amplifiers (PAs), filters, RF modulators (e.g., RF IQ modulators), and digital-to-analog converters (DACs), which RF transceiver 204 may utilize to mix the digital baseband samples received from baseband modem 206 and produce the analog radio frequency signals for wireless transmission by antenna system 202. In some aspects baseband modem 206 may control the radio transmission and reception of RF transceiver 204, including specifying the transmit and receive radio frequencies for operation of RF transceiver 204.

As shown in FIG. 2, baseband modem 206 may include digital signal processor 208, which may perform physical layer (PHY, Layer 1) transmission and reception processing to, in the transmit path, prepare outgoing transmit data provided by protocol controller 210 for transmission via RF transceiver 204, and, in the receive path, prepare incoming received data provided by RF transceiver 204 for processing by protocol controller 210. Digital signal processor 208 may be configured to perform one or more of error detection, forward error correction encoding/decoding, channel coding and interleaving, channel modulation/demodulation, physical channel mapping, radio measurement and search, frequency and time synchronization, antenna diversity processing, power control and weighting, rate matching/dematching, retransmission processing, interference cancelation, and any other physical layer processing functions. Digital signal processor 208 may be structurally realized as hardware components (e.g., as one or more digitally-configured hardware circuits or FPGAs), software-defined components (e.g., one or more processors configured to execute program code defining arithmetic, control, and I/O instructions (e.g., software and/or firmware) stored in a non-transitory computer-readable storage medium), or as a combination of hardware and software components. In some aspects, digital signal processor 208 may include one or more processors configured to retrieve and execute program code that defines control and processing logic for physical layer processing operations. In some aspects, digital signal processor 208 may execute processing functions with software via the execution of executable instructions. In some aspects, digital signal processor 208 may include one or more dedicated hardware circuits (e.g., ASICs, FPGAs, and other hardware) that are digitally configured to specific execute processing functions, where the one or more processors of digital signal processor 208 may offload certain processing tasks to these dedicated hardware circuits, which are known as hardware accelerators. Exemplary hardware accelerators can include Fast Fourier Transform (FFT) circuits and encoder/decoder circuits. In some aspects, the processor and hardware accelerator components of digital signal processor 208 may be realized as a coupled integrated circuit.

Terminal device 102 may be configured to operate according to one or more radio communication technologies. Digital signal processor 208 may be responsible for lower-layer processing functions (e.g., Layer 1/PHY) of the radio communication technologies, while protocol controller 210 may be responsible for upper-layer protocol stack functions (e.g., Data Link Layer/Layer 2 and/or Network Layer/Layer 3). Protocol controller 210 may thus be responsible for controlling the radio communication components of terminal device 102 (antenna system 202, RF transceiver 204, and digital signal processor 208) in accordance with the communication protocols of each supported radio communication technology, and accordingly may represent the Access Stratum and Non-Access Stratum (NAS) (also encompassing Layer 2 and Layer 3) of each supported radio communication technology. Protocol controller 210 may be structurally embodied as a processor configured to execute protocol stack software (retrieved from a controller memory) and subsequently control the radio communication components of terminal device 102 to transmit and receive communication signals in accordance with the corresponding protocol stack control logic defined in the protocol stack software. Protocol controller 210 may include one or more processors configured to retrieve and execute program code that defines the upper-layer protocol stack logic for one or more radio communication technologies, which can include Data Link Layer/Layer 2 and Network Layer/Layer 3 functions. Protocol controller 210 may be configured to perform both user-plane and control-plane functions to facilitate the transfer of application layer data to and from radio terminal device 102 according to the specific protocols of the supported radio communication technology. User-plane functions can include header compression and encapsulation, security, error checking and correction, channel multiplexing, scheduling and priority, while control-plane functions may include setup and maintenance of radio bearers. The program code retrieved and executed by protocol controller 210 may include executable instructions that define the logic of such functions.

In some aspects, terminal device 102 may be configured to transmit and receive data according to multiple radio communication technologies. Accordingly, in some aspects one or more of antenna system 202, RF transceiver 204, digital signal processor 208, and protocol controller 210 may include separate components or instances dedicated to different radio communication technologies and/or unified components that are shared between different radio communication technologies. For example, in some aspects protocol controller 210 may be configured to execute multiple protocol stacks, each dedicated to a different radio communication technology and either at the same processor or different processors. In some aspects, digital signal processor 208 may include separate processors and/or hardware accelerators that are dedicated to different respective radio communication technologies, and/or one or more processors and/or hardware accelerators that are shared between multiple radio communication technologies. In some aspects, RF transceiver 204 may include separate RF circuitry sections dedicated to different respective radio communication technologies, and/or RF circuitry sections shared between multiple radio communication technologies. In some aspects, antenna system 202 may include separate antennas dedicated to different respective radio communication technologies, and/or antennas shared between multiple radio communication technologies. Accordingly, while antenna system 202, RF transceiver 204, digital signal processor 208, and protocol controller 210 are shown as individual components in FI, in some aspects antenna system 202, RF transceiver 204, digital signal processor 208, and/or protocol controller 210 can encompass separate components dedicated to different radio communication technologies. Accordingly, while antenna system 202, RF transceiver 204, digital signal processor 208, and controller 210 are shown as individual components in FIG. 3, in some aspects antenna system 202, RF transceiver 204, digital signal processor 208, and/or controller 210 can encompass separate components dedicated to different radio communication technologies.

Figure 3:
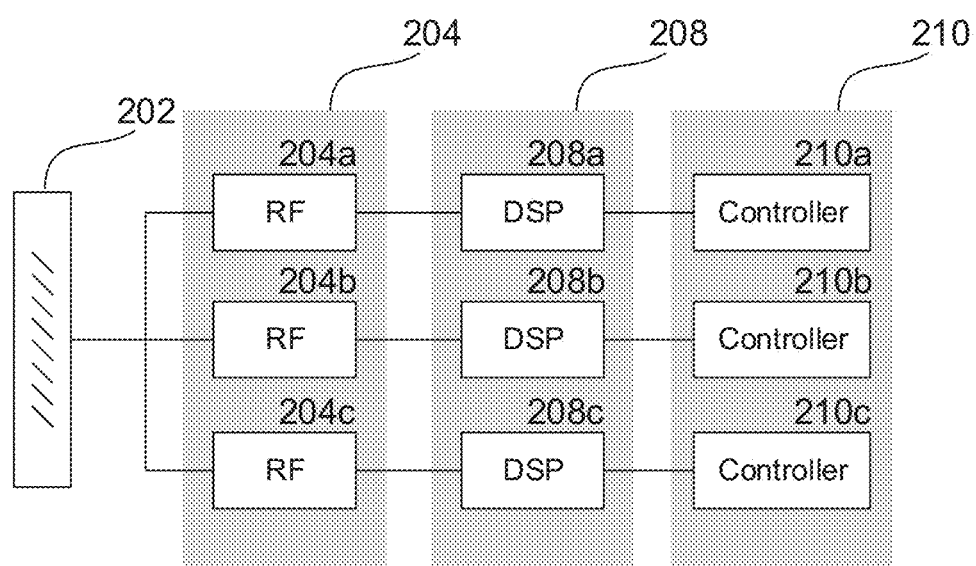
FIG. 3 shows an exemplary configuration of signal acquisition and processing circuitry according to some aspects.

FIG. 3 shows an example in which RF transceiver 204 includes RF transceiver 204a for a first radio communication technology (e.g. LTE), RF transceiver 204b for a second radio communication technology (e.g. 5G NR), and RF transceiver 204c for a third radio communication technology. Likewise, digital signal processor 208 includes digital signal processor 208a for the first radio communication technology (e.g. LTE), digital signal processor 208b for the second radio communication technology (e.g. 5G NR), and digital signal processor 208c for the third radio communication technology. Similarly, controller 210 may include controller 210a for the first radio communication technology (e.g. LTE), controller 210b for the second radio communication technology (e.g. 5G NR), and controller 210c for the third radio communication technology. RF transceiver 204a, digital signal processor 208a, and controller 210a thus form a communication arrangement (e.g., the hardware and software components dedicated to a particular radio communication technology) for the first radio communication technology, RF transceiver 204b, digital signal processor 208b, and controller 210b thus form a communication arrangement for the second radio communication technology, and RF transceiver 204c, digital signal processor 208c, and controller 210c thus form a communication arrangement for the third radio communication technology. While depicted as being logically separate in FIG. 4, any components of the communication arrangements may be integrated into a common component.

Terminal device 102 may also include application processor 212 and memory 214. Application processor 212 may be a CPU, and may be configured to handle the layers above the protocol stack, including the transport and application layers. Application processor 212 may be configured to execute various applications and/or programs of terminal device 102 at an application layer of terminal device 102, such as an operating system (OS), a user interface (UI) for supporting user interaction with terminal device 102, and/or various user applications. The application processor may interface with baseband modem 206 and act as a source (in the transmit path) and a sink (in the receive path) for user data, such as voice data, audio/video/image data, messaging data, application data, basic Internet/web access data, etc. In the transmit path, protocol controller 210 may therefore receive and process outgoing data provided by application processor 212 according to the layer-specific functions of the protocol stack, and provide the resulting data to digital signal processor 208. Digital signal processor 208 may then perform physical layer processing on the received data to produce digital baseband samples, which digital signal processor may provide to RF transceiver 204. RF transceiver 204 may then process the digital baseband samples to convert the digital baseband samples to analog RF signals, which RF transceiver 204 may wirelessly transmit via antenna system 202. In the receive path, RF transceiver 204 may receive analog RF signals from antenna system 202 and process the analog RF signals to obtain digital baseband samples. RF transceiver 204 may provide the digital baseband samples to digital signal processor 208, which may perform physical layer processing on the digital baseband samples. Digital signal processor 208 may then provide the resulting data to protocol controller 210, which may process the resulting data according to the layer-specific functions of the protocol stack and provide the resulting incoming data to application processor 212. Application processor 212 may then handle the incoming data at the application layer, which can include execution of one or more application programs with the data and/or presentation of the data to a user via a user interface.

Application processor 212 may be configured to support user interactions with a user via display 216, which may be, for example, a conventional touch display such as a Liquid Crystal (LCD) display, or, if display is not a touch display, a keypad (not pictured) may be provided for a user to operate the terminal device 102.

Memory 214 may embody a memory component of terminal device 102, such as a hard drive or another such permanent memory device. Although not explicitly depicted in FIG. 2, the various other components of terminal device 102 shown in FIG. 2 may additionally each include integrated permanent and non-permanent memory components, such as for storing software program code, buffering data, etc.

In accordance with some radio communication networks, terminal devices 102 and 104 may execute mobility procedures to connect to, disconnect from, and switch between available network access nodes of the radio access network of radio communication network 100. As each network access node of radio communication network 100 may have a specific coverage area, terminal devices 102 and 104 may be configured to select and re-select between the available network access nodes in order to maintain a strong radio access connection with the radio access network of radio communication network 100. For example, terminal device 102 may establish a radio access connection with network access node 110 while terminal device 104 may establish a radio access connection with network access node 120. In the event that the current radio access connection degrades, terminal devices 102 or 104 may seek a new radio access connection with another network access node of radio communication network 100; for example, terminal device 104 may move from the coverage area of network access node 112 into the coverage area of network access node 110. As a result, the radio access connection with network access node 112 may degrade, which terminal device 104 may detect via radio measurements such as signal strength or signal quality measurements of network access node 112. Depending on the mobility procedures defined in the appropriate network protocols for radio communication network 100, terminal device 104 may seek a new radio access connection (which may be, for example, triggered at terminal device 104 or by the radio access network), such as by performing radio measurements on neighboring network access nodes to determine whether any neighboring network access nodes can provide a suitable radio access connection. As terminal device 104 may have moved into the coverage area of network access node 110, terminal device 104 may identify network access node 110 (which may be selected by terminal device 104 or selected by the radio access network) and transfer to a new radio access connection with network access node 110. Such mobility procedures, including radio measurements, cell selection/reselection, and handover are established in the various network protocols and may be employed by terminal devices and the radio access network in order to maintain strong radio access connections between each terminal device and the radio access network across any number of different radio access network scenarios.

Figure 4:
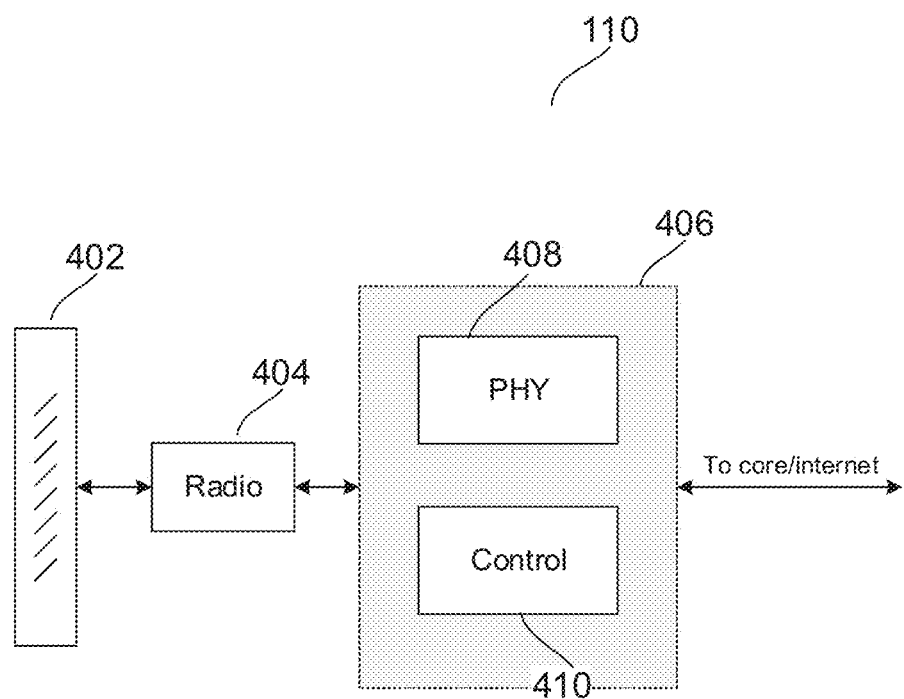
FIG. 4 shows an exemplary internal configuration of a network access node in some aspects.

FIG. 4 shows an exemplary internal configuration of a network access node, such as network access node 110, which may be configured to provide LTE and/or 5G radio services according to some aspects. Although explained with respect to network access node 110, the following explanation may also encompass other network access nodes described herein, e.g. network access nodes 620 and 622.

As shown in FIG. 4, network access node 110 may include antenna system 402, radio transceiver 404, and baseband subsystem 406 (including physical layer processor 408 and protocol controller 410). In an abridged overview of the operation of network access node 110, network access node 110 may transmit and receive wireless signals via antenna system 402, which may be an antenna array including multiple antennas. Radio transceiver 404 may perform transmit and receive RF processing to convert outgoing baseband samples from baseband subsystem 406 into analog radio signals to provide to antenna system 402 for radio transmission and to convert incoming analog radio signals received from antenna system 402 into baseband samples to provide to baseband subsystem 406. Physical layer processor 408 may be configured to perform transmit and receive PHY processing on baseband samples received from radio transceiver 404 to provide to controller 410 and on baseband samples received from controller 410 to provide to radio transceiver 404. Controller 410 may control the communication functionality of network access node 110 according to the corresponding radio communication technology protocols, which may include exercising control over antenna system 402, radio transceiver 404, and physical layer processor 408. Each of radio transceiver 404, physical layer processor 408, and controller 410 may be structurally realized with hardware (e.g., with one or more digitally-configured hardware circuits or FPGAs), as software (e.g., as one or more processors executing program code defining arithmetic, control, and I/O instructions stored in a non-transitory computer-readable storage medium), or as a mixed combination of hardware and software. In some aspects, radio transceiver 404 may be a radio transceiver including digital and analog radio frequency processing and amplification circuitry. In some aspects, radio transceiver 404 may be a software-defined radio (SDR) component implemented as a processor configured to execute software-defined instructions that specify radio frequency processing routines. In some aspects, physical layer processor 408 may include a processor and one or more hardware accelerators, wherein the processor is configured to control physical layer processing and offload certain processing tasks to the one or more hardware accelerators. In some aspects, controller 410 may be a controller configured to execute software-defined instructions that specify upper-layer control functions. In some aspects, controller 310 may be limited to radio communication protocol stack layer functions, while in other aspects controller 410 may also be configured for transport, internet, and application layer functions.

Network access node 110 may thus provide the functionality of network access nodes in radio communication networks by providing a radio access network to enable served terminal devices to access communication data. For example, network access node 110 may also interface with a core network, one or more other network access nodes, or various other data networks and servers via a wired or wireless backhaul interface.

Figure 5:
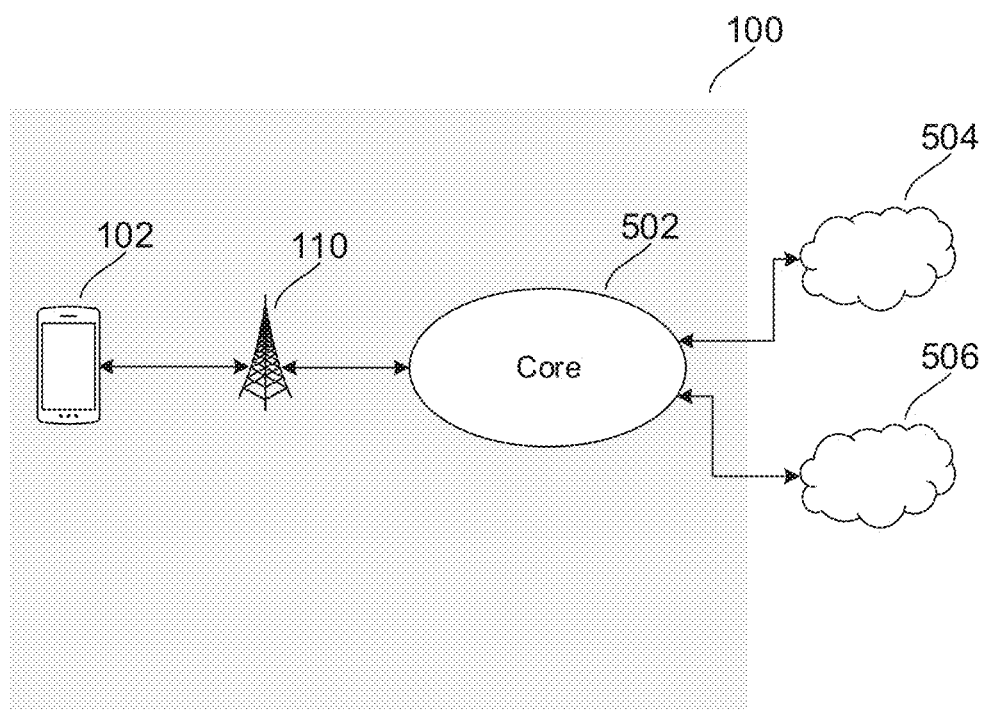
FIG. 5 shows an exemplary configuration of a network access node interfacing with core network according to some aspects.

As previously indicated, network access nodes 110 and 120 may interface with a core network. FIG. 5 shows an exemplary configuration in accordance with some aspects where network access node 110 interfaces with core network 502, which may be, for example, a cellular core network. Core network 502 may provide a variety of functions to manage operation of radio communication network 100, such as data routing, authenticating and managing users/subscribers, interfacing with external networks, and various other network control tasks. Core network 502 may therefore provide an infrastructure to route data between terminal device 104 and various external networks such as data network 504 and data network 506. Terminal device 102 may thus rely on the radio access network provided by network access node 110 to wirelessly transmit and receive data with network access node 110, which may then provide the data to core network 502 for further routing to external locations such as data networks 504 and 506 (which may be packet data networks (PDNs)). Terminal device 102 may therefore establish a data connection with data network 504 and/or data network 506 that relies on network access node 110 and core network 502 for data transfer and routing.

Some of the 5G deployment schemes to compliment LTE introduced by Release 15 of 3GPP provide various architectural options which are based on an LTE and NR dual connectivity. In these dual connectivity modes, a Data Resource Bearer (DRB) can be configured so that data is transmitted through an LTE leg, through an NR leg, or through both types.

NR is a new radio technology. It is the first time that dual connectivity on two different RATs will be deployed. It is also the first time that the master service cell that the terminal device is camped on may not be the one offering the best service capability. If a terminal device is camped on an LTE cell as the master cell, for example, the technology indicator displayed to the user on the screen of the terminal device will indicate to the user that they are camped on an LTE RAT. However, this legacy approach may no longer be suitable with the multi-RAT connectivity modes introduced by 3GPP Release 15.

In EN-DC mode, for example, a primary network access node (also referred to as a master network access node) is the LTE node, i.e. eNodeB (eNB), and the secondary network access node (also referred to as a slave network access node) is the NR node, i.e. gNodeB (gNB). Both nodes have a direct interface with the existing core network in the user plane that carries the user data, but only the primary network access node has the direct interface with the core network in the control plane responsible for carrying the signaling traffic between the terminal device and the core network. The DRBs are used to transport data between the network and the terminal device. EN-DC can support Master Cell Group (MCG) DRBs, which are bearers terminating at the master network access node and only use lower layers of the master network access node; MCG split DRBs, which are bearers terminating at the master network access node but may use the lower layers of the master network access node and/or the secondary network access node; Secondary Cell Group (SCG) DRBs, which are bearers terminating at the secondary network access node and only use the lower layers of the secondary network access node; and SCG split DRBs, which are bearers terminating at the secondary network access node but may use the lower layers of the secondary network access node and/or the master network access node.

In dual connectivity, the terminal device has the Control and User (i.e. Data) planes simultaneously connected to both the primary network access node, e.g. eNB, and a secondary network access node, e.g. gNB. Accordingly, in order to benefit from the dual connectivity, the baseband modem must be configured with separate protocol stacks (including RLC and MAC) for each of the primary network access node and the secondary network access node. Additionally, the terminal device configured for dual connectivity will include dual radio front ends with both receiver and transmitters allowing for the full connection to both the master network access node and the secondary network access node.

However, in these dual connectivity modes, current methods and apparatuses are only configured to indicate the Radio Access Technology (RAT) of the primary cell on which a terminal device is camped on, e.g. in EN-DC mode, this will be the LTE cell. In other words, the legacy method for displaying the technology indicator does not allow the ability to indicate that the RAT providing the majority of the radio bandwidth to the user is different from the RAT of the master cell on which the terminal device is camped on. By using the legacy approach, while camped on an LTE master cell, the device may be using a higher amount of NR (e.g. 5G) resources, and it may be necessary for the terminal device to display this to the user accordingly. Therefore, current methods and devices are not configured to properly indicate to the user that an NR (e.g. 5G) cell may be available, or, furthermore, that NR may be available for a particular service.

It may be advantageous for operators to indicate 5G availability to the user when camped on these dual connectivity modes, for example, when the LTE cell is the primary cell and the 5G cell serves as a secondary cell but provides greater bandwidth to the user. In some aspects, options may include a flag, or an indicator, in the LTE system information broadcasted by the LTE cell.

In some aspects, the disclosure herein provides using a Data Radio Bearer (DRB) assignment as an input for providing a technology indicator. The DRB is used to carry data associated with an Evolved Packet System (EPS) bearer wherein the specific data flow may be identified by a Traffic Flow Template (TFT) with a given Quality of Service (QoS), e.g. for Voice over LTE (VoLTE), Video over LTE (ViLTE), web browsing, etc. The DRB may provide a guaranteed bit rate between a network access node and a terminal device. For example, the DRB assignment may indicate whether the terminal device is configured to use an LTE leg, an NR leg, or both legs as an input 5G technology indicator. In some scenarios, multiple DRBs may be available or in use and the methods and devices described herein are able to indicate the services available across the DRBs accordingly. If both LTE and NR are available, the methods and devices disclosed herein may be configured to display this to the user.

In some aspects, the technology indicator methods and devices may focus on the input criteria used to display the LTE and/or NR availability, even though the terminal device may be in Connected mode with a master cell, e.g. master LTE cell. In some aspects, the terminal device may display the RAT in use or available for use per service, e.g. voice over LTE (VoLTE), video services, V2X, etc.

Figure 6:
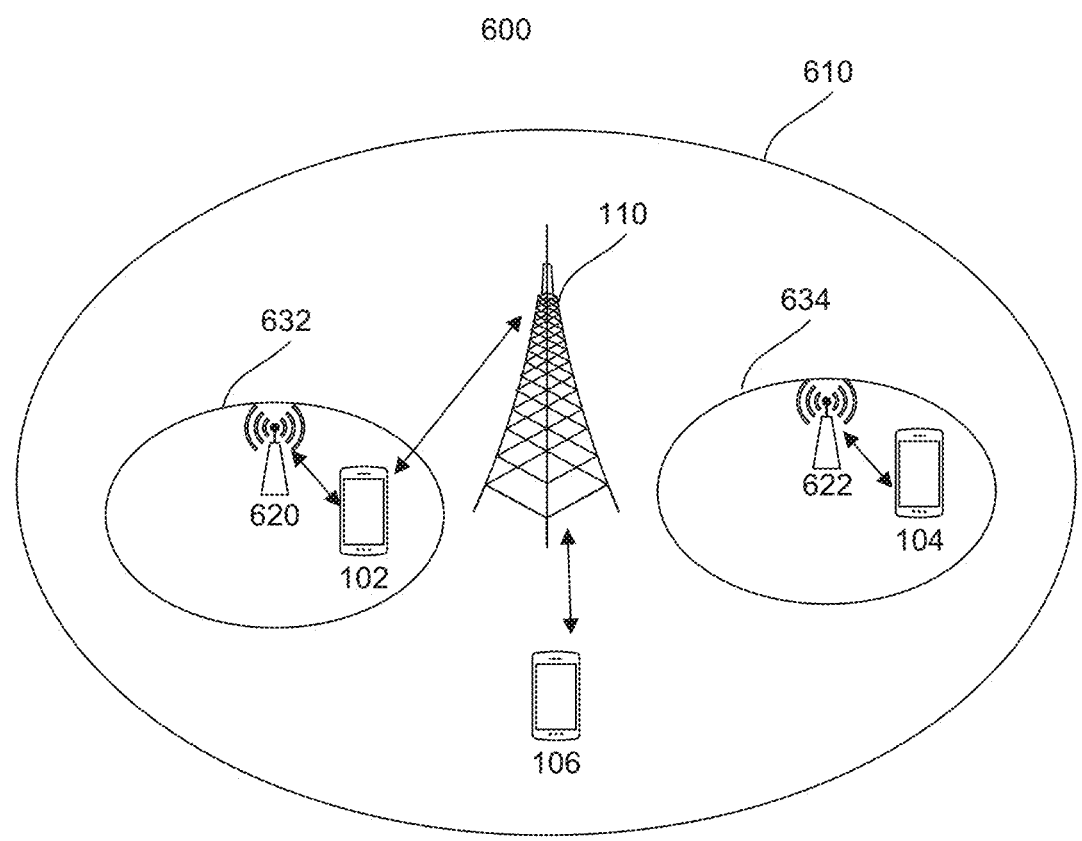
FIG. 6 shows a communication network with a primary (i.e. master) cell and secondary (i.e. slave) cells according to some aspects.

FIG. 6 shows a communication network 600 with a master cell 610 and secondary cells 632-634 according to some aspects. It is appreciated that network 600 is exemplary in nature and may therefore be simplified for purposes of this explanation. While shown as one cell for the master cell and each of the secondary cells, it is appreciated that the cells may be a part of a cell group or may be further divided into smaller cells forming a larger cell group.

Each of terminal devices 102-106 may be configured with dual connectivity so as to connect simultaneously to an Evolved Node Bs (eNodeB or eNB) such as a master eNB 110 serving cell 610 with LTE and one of Next Generation Node Bs (gNodeBs or gNBs) 620-622 serving as secondary network access nodes for cells 632-634, respectively, and providing 5G NR. In another example, the master network access node may be a gNB, i.e serving 5G NR, and the secondary access nodes may be eNBs, i.e. serving LTE. For purposes of this explanation, the master network access node will be referred to as an eNB and the secondary network access nodes will be referred to as gNBs, but it is appreciated that the roles may be reversed.

Each of the network access nodes 110 and 620-622 may operate on different carrier frequencies and may be interconnected via backhaul links (e.g. an X2 interface, not shown). For example, gNBs 622-624 may be configured to communicate via frequency ranges supporting 5G NR and eNB 110 may be configured to communicate via frequency ranges supporting LTE.

As shown in network 600, terminal device 104 is connected to the network via secondary gNB 622 and terminal device 106 is connected to the network via master eNB 110, i.e. terminal devices 104-106 are in single connection mode. Terminal device 102, however, is connected to the network via both master eNB 110 and secondary gNB 620 simultaneously, i.e. it is in dual connectivity mode. This may increase throughput to terminal device 102 by utilizing resources from both master eNB 110 and secondary gNB 620 and also increase system reliability by diminishing the occurrence of service interruptions that might occur due to millimeter wave (mmW) propagation characteristics used by NR and/or because of line of sight (LoS) issues which may arise due to narrow beams in massive multiple input multiple output (MIMO) systems. The radio bearers, e.g. DRBs, are provided in the network access links shown between each of terminal devices 102-106 and the respective network access nodes to which they are connected. While only network access link is shown between each device and each network access node, it is appreciated that one or more radio bearers may be established between each terminal device and the network access nodes, e.g. one DRB for each of a specific type of service.

In some aspects, the ability to display the appropriate technology indicator(s) may be applied to a terminal device in Connected mode, e.g. when dual connectivity is established. When configured with dual connectivity, the terminal device is simultaneously connected to two network access nodes, e.g. two eNBs (one of which serves as the master), one eNB and one gNB (either one capable of serving as the master), etc. The master and secondary network access nodes may be connected via an interface, e.g. X2 interface. Furthermore, the terminal device may be in a RRC connected mode or in idle mode. When in RRC connected mode, the terminal device has an active radio connection with the network and can transmit/receive data. When in idle mode, the terminal device may only be paged and must perform a random access procedure in order to initiate active communication with the network. In idle mode, the terminal device may only be camped on an LTE master cell and thus the technology indicator need only reflect the LTE RAT, or it may be camped on a 5G NR cell in some architectural options.

In some aspects, the devices and methods described herein enable the reporting of a technology indicators when the radio technology of the master cell the terminal device is camped on is different from the radio technology used to offer the best/optimal user experience. This may include a method in the cellular protocol stack to determine the technology indicator(s) based on the presence of an active Radio Link Control (RLC) leg, a method in the cellular protocol stack to determine the technology indicator(s) based on the exchange of data on an active RLC leg, and/or a method in the cellular protocol stack to determine the technology indicator(s) based on the type of data exchanged on an active RLC leg for a specific service using a filter to identify the type of data and service.

The display of the appropriate technology indicator is based on the active RLC leg of the terminal device. Accordingly, technology indicator methods use the active RLC leg in order to display the RAT in use to the user. However, in dual connectivity mode, the RLC may have two active legs: LTE and NR.

By implementing these methods, the devices described herein are able to display the appropriate technology indicator(s) based on the usage of the RLC legs even if the radio technology providing the majority of the radio bandwidth for the user is different from the radio technology of the master cell that the terminal device is camped on.

A terminal device, such as 102, being configured with dual connectivity does not necessarily mean that the device will be configured to appropriately reflect NR services, especially when camped on a master LTE cell. Accordingly, the devices and methods of this disclosure are configured to accurately reflect to the user the availability of different RATs in dual connectivity mode so as to provide the user with an enhanced user experience, e.g. increased bandwidth and/or decreased latency for certain applications and/or scenarios. Also, by implementing the methods and devices described herein, users may be able to select a particular RAT available for a particular service.

Figure 7:
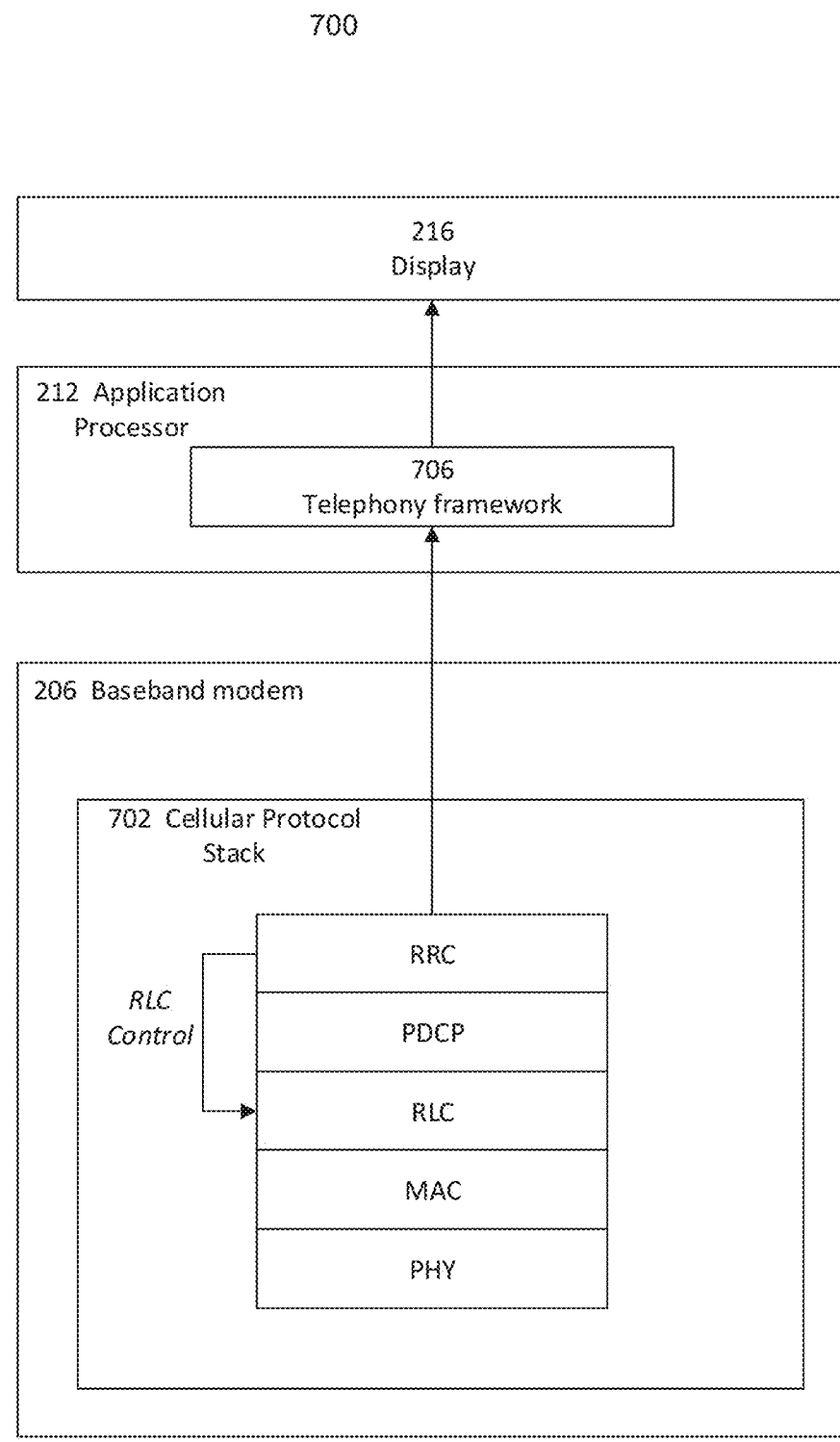
FIG. 7 shows a terminal device architecture according to some aspects.

FIG. 7 shows a terminal device architecture 700 in some aspects. Architecture 700 may be used to notify the user of a terminal device of the availability of NR radio link for data transfer.

As previously described, baseband modem 206 may be responsible for executing functions of the cellular protocol stack 702 via DSP 208 and controller 210. Physical layer (PHY) functions may be executed by DSP 208 while upper layer functions, e.g. Media Access Control (MAC), Radio Link Control (RLC), Packet Data Convergence Protocol (PDCP), and Radio Resource Control (RRC) (other layers not shown in architecture 700 include the Non-Access Stratum (NAS) layer, which is responsible for the establishment of communication sessions and for maintaining continuous communications with the terminal device as it moves, and the Access Stratum (AS) layer, which is responsible for transporting data over a wireless connection with a network and managing radio resources), may be executed by controller 210. Application processor 212 may execute higher levels of the protocol stack, e.g. APP layer.

The RRC layer is configured to provide RRC signaling to the PDCP layer for transmission over the air and receive RRC PDUs (Protocol Data Units) from the PDCP layer. The RRC layer is further configured to provide the RLC layer with RLC Control. The RLC layer may communicate with the PDCP layer via transmission/reception of PDCP PDUs. The RLC is responsible for upper layer PDUs and segmentation and reassembly of RLC PDUs, among other tasks. The RRC is responsible for maintenance and release of point to point radio bearers, broadcasting of system information related to the NAS and access stratum (AS), paging, establishment, maintenance and release of an RRC connection between the terminal device and E-UTRAN, and other security functions. The PDCP layer is responsible for header compression and decompression of internet protocol (IP) data.

In some aspects, architecture 700 is configured to determine the availability of a 5G radio link for data transmission and reception for a device supporting Non-Standalone (NSA) mode. NSA mode utilizes the existing LTE radio and core network for mobility management and coverage while adding the 5G carrier. In the EN-DC NSA mode, the LTE eNB acts as the master network access node (i.e. primary network access node) and the NR gNB acts as the slave network access node (i.e. secondary network access node). In the NE-DC mode, the NR gNB may serve as the primary network access node.

The Radio Resource Control (RRC) component in the cellular protocol stack 702 determines whether the radio bearer (the virtual interface with the respective one or more network access nodes) is configured with one or two RLC legs and to which RAT each of the RLC legs correspond to. For example, the RLC leg(s) may correspond to LTE and/or NR technology. The RRC component may determine the type of these RLC legs based on a configuration message, e.g. RRCConnectionReconfiguration message, an RRCReconfiguration message, an RRCResume message, etc., received from one or more of the network access nodes such as the master eNB in the case of EN-DC or the master gNB in the case of NE-DC. A configuration message which can add, modify, and/or release radio bearers including RLC legs may be considered within the meaning of the configuration message. The configuration message will indicate whether the dual connectivity device is using LTE, 5G NR, or both RATs.

In some aspects, the RRC component can be RAT specific. For example, one RRC component may be responsible for LTE radio resource management and another RRC component may be responsible for 5G NR radio resource management. If there are two RRC components, one for LTE and another for 5G NR, the device is configured to determine between the two RRC components to verify whether 5G NR is available. The two RRC components may communicate with each other to signal the availability of a particular RLC leg and the corresponding DRB identifier. In other aspects, the RRC component may be integrated, meaning that it may handle the radio resource management across several RATs, e.g. LTE and 5G NR.

Architecture 700 implementing the methods and schemes described herein may provide operators with several advantages. By displaying a 5G technology indicator when connected via 5G in dual connectivity mode, for example, the device is able to more appropriately reflect which RAT is in use, or, in some aspects, the availability of a specific RAT for a particular service. Legacy methods would only allow for the display of an LTE technology indicator in the case that a master cell is an LTE cell even though the device may also be camped on a secondary cell using 5G NR technology.

When the RRC component, or the master RRC component in the case of RAT specific RRC components, detects that at least one DRB is available with an RLC leg on at least one radio technology, the RRC Component may send a notification to the telephony framework 706 component of Application processor 212. The telephony framework 706 may then show on the device display 216 technology indicator(s) reflecting the RAT(s) available for data transfer. The technology indicator may be provided through an AT command interface displaying that the device is connected to 5G, for example, in cases where the device is also connected to a master LTE cell. The user notification may be provided as an icon or a text notification on the screen specifying that 5G services are available and/or may be provided by a tone or a vibration.

Upon detecting that among all active DRBs there is no longer an RLC leg for a given radio technology (e.g. 5G no longer available), the RRC component may notify telephony framework 706 on Application processor 212 that the corresponding radio technology is no longer available for data transfer.

The interface used by the Cellular Protocol Stack 702 to notify the telephony framework 706 of RAT availability may be based on an AT command protocol, Peripheral Component Interconnect Express (PCIe) protocol, or other protocol. Examples for reporting parameters may include: RAT-LTE and/or NR; DRB ID; Evolved Packet System (EPS) ID; Quality Flow Indicator (QFI); etc. In some aspects, these parameters may be reported on a per service basis.

The telephony framework 706 provides access information for a cellular service provider, i.e. operator. The operator may provide a library to a Radio Interface Layer (RIL) of telephony framework 706 for processing and managing all communications for telephony services. The telephony framework 706 is further responsible for providing the user with an interface to the components of the baseband modem 206.

The technology indicator can be reported globally (e.g. at least one RLC leg is active on a given technology for at least one DRB) or it may be reported specifically for each DRB, for each EPS bearer, or for each QFI. The EPS bearer is a virtual connection between the terminal device and the Packet Data Network Gateway (PGW) which identifies data sent and received between the two end points with a specific QoS attribute. The PGW serves as the interface between the LTE network and other packet data networks, e.g. 5G, internet based networks, etc.

In some aspects, a technology indicator may be reported per specific service, e.g. IP Multimedia Subsystem (IMS) speech service, IMS video service, video streaming service, Vehicle-to-Everything (V2X) service, etc. In a dual connectivity case for example, both the NR RLC leg and the LTE RLC leg may be configured on one specific DRB. Accordingly, the devices and methods of this disclosure would be configured to distinguish between the following exemplary scenarios: Packet send/received on NR RLC leg only-technology indicator indicates NR; Packet send/received on LTE RLC leg only-technology indicator indicates LTE; Packet send/received on LTE and NR RLC leg simultaneously-technology indicator indicates NR and LTE. In some aspects, in the case where packets are sent/received on both LTE and NR, only the NR service may be provided to the user, e.g. via icon on the device display and/or via a tone/vibration.

The service identification may be based on the bearer quality of service (QoS), e.g. for IMS voice has a reserved bearer with a QoS=1). The service identification can also be based on the inspection of the packet flowing through a specific RLC leg. The service type may be identified based on the content of the protocol header, and if the packet is sent on a specific RLC leg (e.g. LTE or NR), the RAT may be determined.

In some aspects, a timer can be implemented to indicate whether the RAT is in use for a particular service or not. The additional flow of data can be dynamic, meaning that the data may fluctuate over one RLC leg or another. A timer may be provided in order to allow for the refresh of the determination and identification of the active RLC legs. Every time the timer lapses, the identification and determination of the activity of the 5G and/or LTE RLC legs may be executed, for example, in order to provide the user with the most up-to-date information regarding RAT availability. The timer may be linked to how often the display of the terminal device is refreshed, and may be further linked to providing a balance of battery life with up-to-date information. For example, the more often the timer lapses and the information is refreshed, the more costly it is to the battery resources. However, the use is provided with more up-to-date information. On the other hand, providing for a timer with longer durations may save battery resources, but may also provide the user with out of date RAT availability information which may degrade the user experience.

In some aspects, the timer may be started when an RLC leg associated with a RAT (e.g. LTE, 5G NR, etc.) is created. Each time a packet is sent or received over the RLC leg, the timer is restarted. Upon timer expiry, the RLC leg may be considered to be unused, and if all the RLC legs associated with a RAT are not used, then the technology indicator to be forwarded to the user (e.g. via the display) may be updated.

Figure 8:
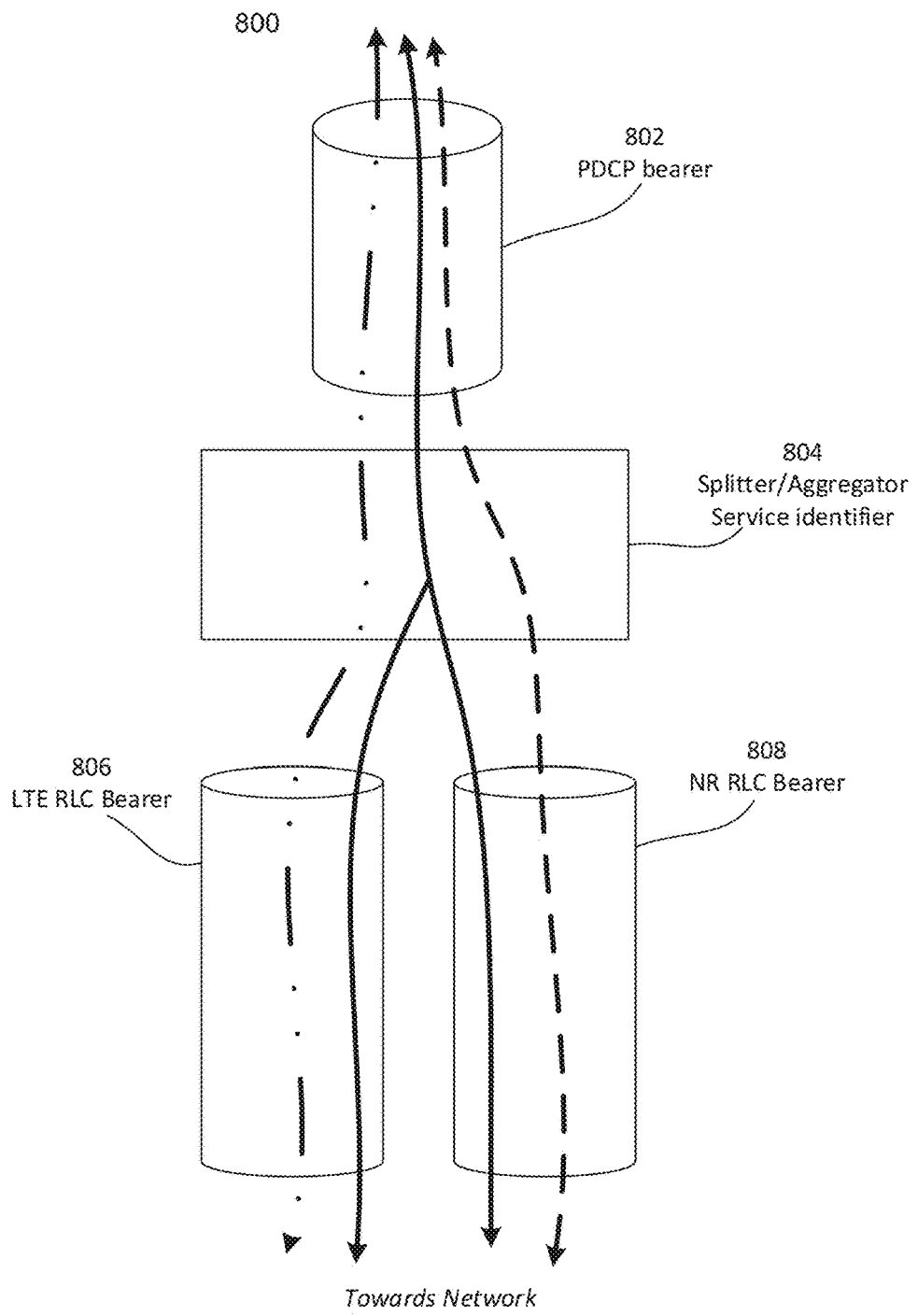
FIG. 8 shows an exemplary diagram depicting a technology indicator per service flow according to some aspects.

FIG. 8 is a diagram 800 showing an example of technology indicator per service flow according to some aspects. Diagram 800 shows the flow and identification of data through several components of the Cellular Protocol Stack of the baseband modem of a terminal device in some aspects. It is appreciated that diagram 800 is exemplary in nature and may therefore be simplified for purposes of this explanation.

In diagram 800, each of the LTE and NR RATs have RLC bearers 806 and 808, respectively, where data is communicated towards the network (e.g. via the MAC and PHY layers of the Cellular Protocol Stack of the baseband modem). Splitter/aggregator service identifier 804 may be configured to identify a RAT (e.g. LTE or NR) for the respective RLC leg for a specific service, e.g. voice, video, V2X, etc. This identification may be performed on the basis of the content of the protocol header of a communicated packet and may be forwarded to the PDCP bearer 802 for further communications with the protocol stack and, eventually, through the application processor, to the user.

FIG. 9 shows exemplary internal configurations of a baseband modem controller 210 and an application processor 212 according to some aspects. As shown in FIG. 9, controller 210 may include processor 902 and memory 904, and application processor 212 may include processor 952 and memory 954. Processors 902 and 952 may be a single processor or multiple processors, and may be configured to retrieve and execute program code to perform the transmission and reception, channel resource allocation, and cluster management as described herein. Processors 902 may transmit and receive data over a software-level connection that is physically transmitted as wireless radio signals by digital signal processor 208, RF transceiver 204, and antenna 202. Processor 952 may transmit and receive data over a software-level connection that is physically transmitted via interface with controller 210, displace 216, or other components of a terminal device.

Memory 904 may be a non-transitory computer readable medium storing instructions for one or more of an Identification subroutine 904a and Determination subroutine 904b. Memory 954 may be a non-transitory computer readable medium storing instructions for one or more of a Reception subroutine 954a and Display subroutine 954b.

Identification subroutine 904a and Determination subroutine 904b may each be an instruction set including executable instructions that, when retrieved and executed by processor 902, perform the functionality of controller 210 as described herein. In particular, processor 902 may execute Identification subroutine 904a and Determination subroutine 904b for identifying a first Radio Access Technology (RAT) corresponding to the first network access link and a second RAT corresponding to the second network access link, wherein the first RAT and the second RAT are different RATs and determining a first RAT Radio Link Control (RLC) leg for the first RAT and a second RAT RLC leg for the second RAT. As previously described, Identification subroutine 904a and Determination subroutine 904b may therefore include executable instructions for determining the first RAT RLC and for the second RAT RLC leg comprises detecting an active communication of data on the respective RLC leg; determining a first type of data on the second RAT RLC leg; identifying a service associated with the first type of data, wherein the identifying of the service is performed by obtaining an information from a packet used to communicate the first type of data; and/or receiving a configuration message, wherein the determining of the first RAT RLC and for the second RAT RLC leg is performed based on the configuration message. For example, the configuration message may be an RRCConnectionReconfiguration message, an RRCReconfiguration message, an RRCResume message, etc. A configuration message which can add, modify, and/or release radio bearers including RLC legs may be considered within the meaning of the configuration message.

Identification subroutine 904a and Determination subroutine 904b may also include executable instructions detecting at least one data resource bearer (DRB) available on at least one of the first RAT RLC leg or the second RAT RLC leg.

Reception subroutine 954a and Display subroutine 954b may each be an instruction set including executable instructions that, when retrieved and executed by processor 952, perform the functionality of application processor 212 as described herein. In particular, processor 902 may execute Reception subroutine 954a and Display subroutine 954b for receiving RATs identified based on RLC legs and/or DRBs from the baseband modem 206 and forwarding the identified RATs to a display of the terminal device.

Figure 10:
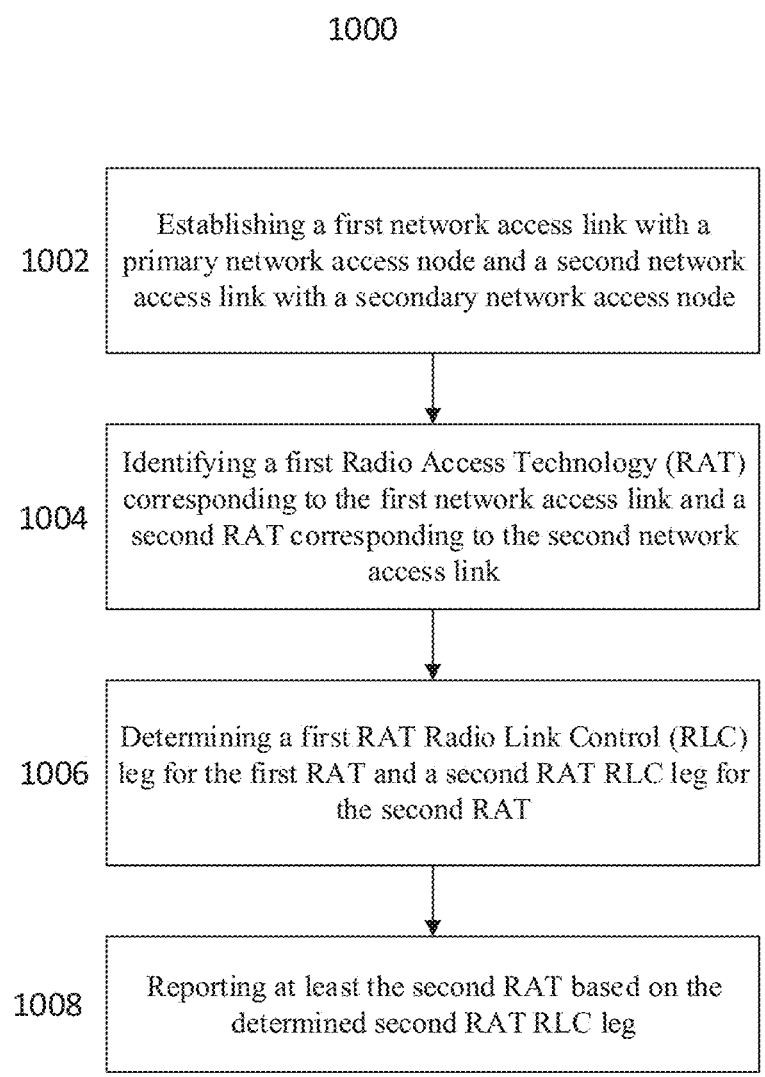
FIG. 10 shows a flowchart detailing a method according to some aspects.

FIG. 10 shows a flowchart 1000 according to some aspects. It is appreciated that flowchart 1000 is exemplary in nature and may therefore be simplified for purposes of this explanation.

In 1002, the terminal device establishes a first network access link with a primary network access node and a second network access link with a secondary network access node. The first network access link and the second network access link may be configured to concurrently and simultaneously communicate data with the primary network access node and the secondary network access node, respectively.

In 1004, the terminal device identifies a first Radio Access Technology (RAT) corresponding to the first network access link and a second RAT corresponding to the second network access link. The first RAT and the second RAT may be different RATs, e.g. LTE and NR.

In 1006, the terminal device determines a first RAT Radio Link Control (RLC) leg for the first RAT and a second RAT RLC leg for the second RAT.

In 1008, the terminal device reports at least the second RAT based on the determined second RAT RLC leg to a user. For example, this may be reported to the user via the display of the terminal device.

Figure 11:
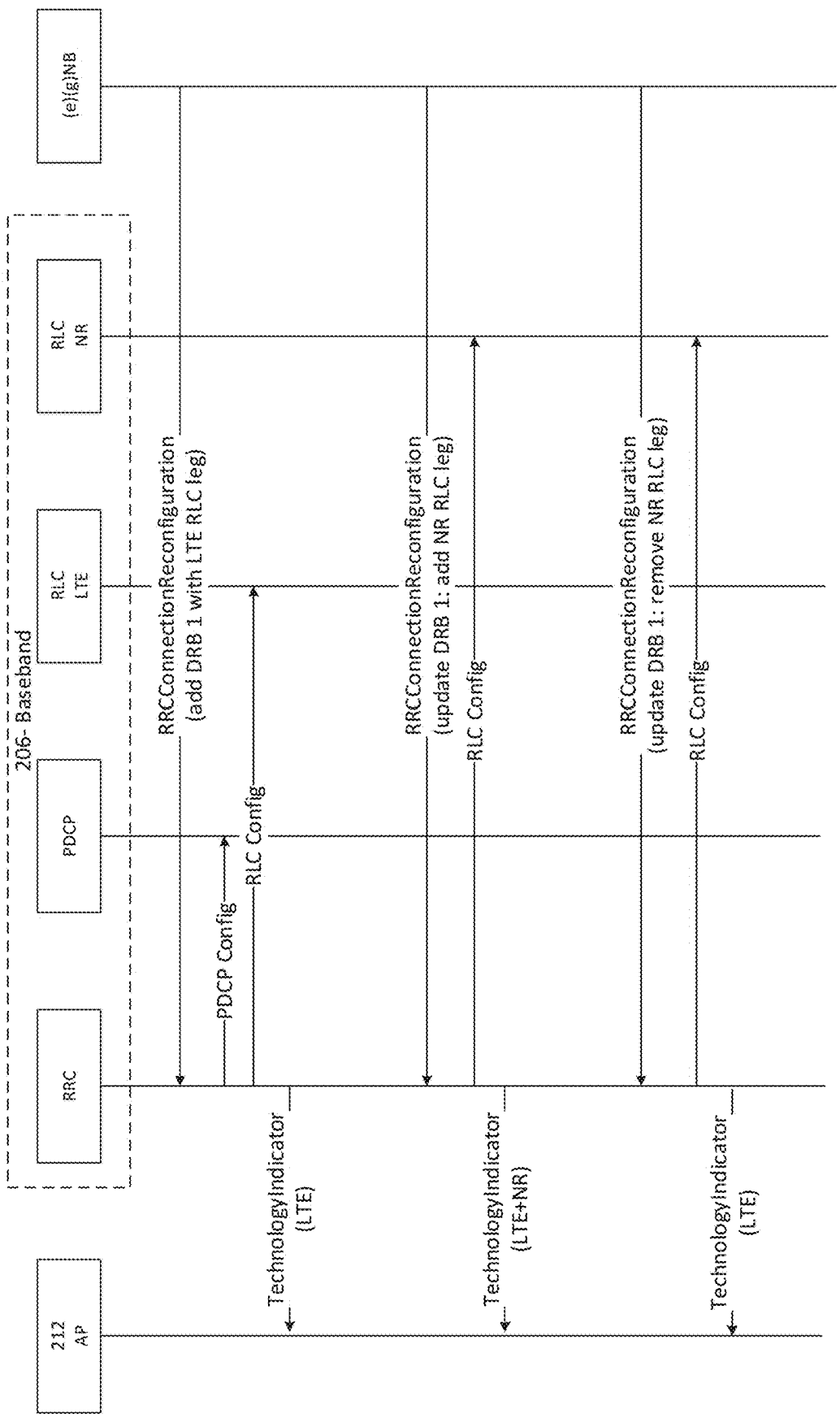
FIG. 11 shows a message sequence chart for reporting a technology indicator based on an RLC leg in some aspects.
Figure 12:
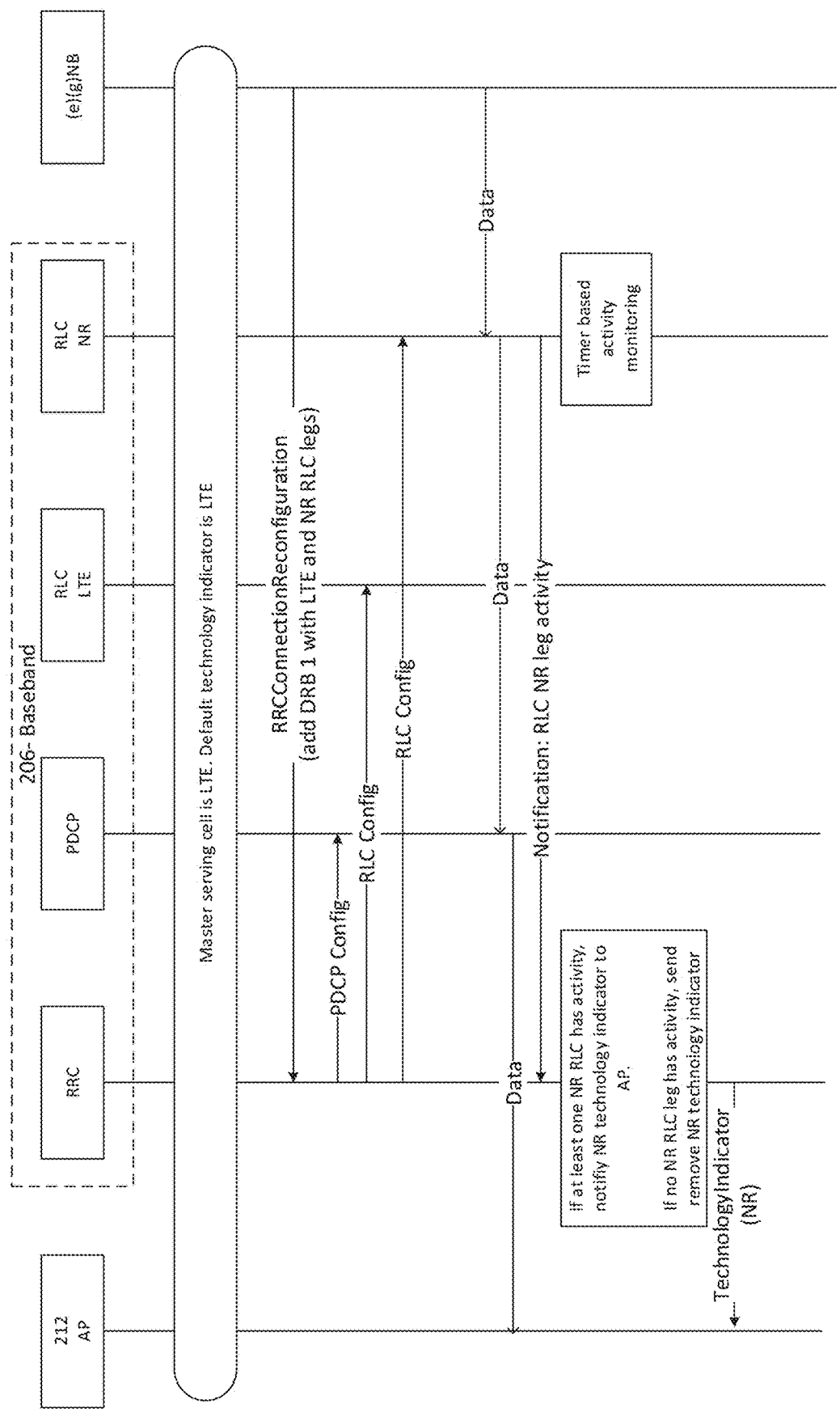
FIG. 12 shows a message sequence chart for reporting a technology indicator based on data traffic in some aspects.
Figure 13:
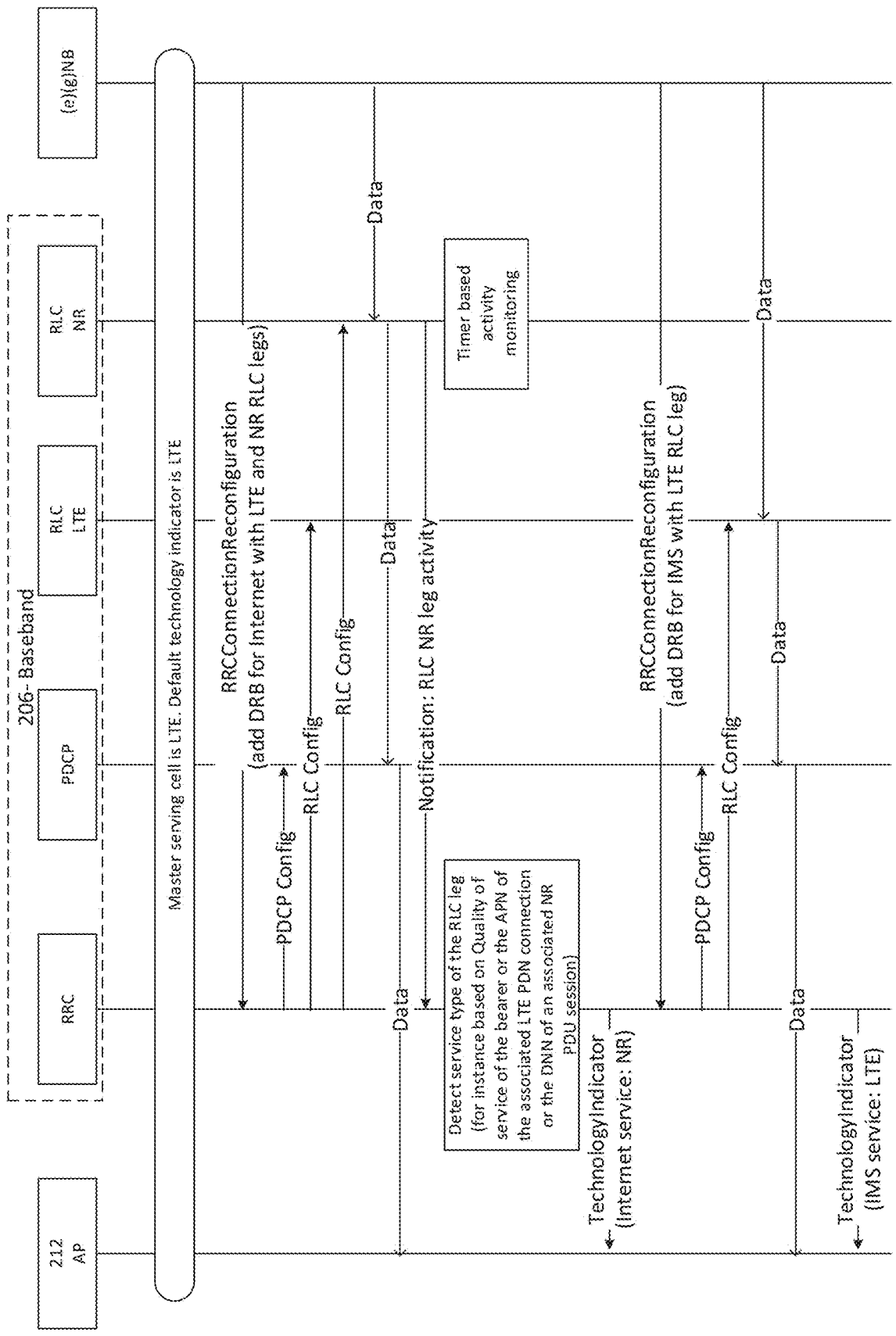
FIG. 13 shows a message sequence chart for reporting a technology indicator per service based on data traffic in some aspects.

FIG. 11-13 show exemplary message sequence charts (MSCs) 1100, 1200, and 1300 according to some aspects. MSC 1100 shows the reporting of a technology indicator based on an RLC leg, MSC 1200 shows the reporting of a technology indicator based on data traffic, and MSC 1300 shows the reporting of a technology indicator per service based on data traffic.

The procedure shown in MSC 1300 for reporting the technology indicator per service is similar to that shown in MSC 1200 for reporting the technology indicator based on data traffic with the main difference being that the terminal device is further configured to identify for which service there is a DRB or RLC in use. Then, the technology indicator is reported based on the identified RAT type of the DRB or RLC for this service. In some aspects, method for identifying the type of service may include quality of service (QoS), the Access Point Name (APN), the Data Network Name (DNN), client type, and/or the type of packet received on the leg. The client type may be provided via notification from the Application Processor. The type of packet received may require a packet inspection to identify the headers of the protocols associated with the packet.

Figure 14:
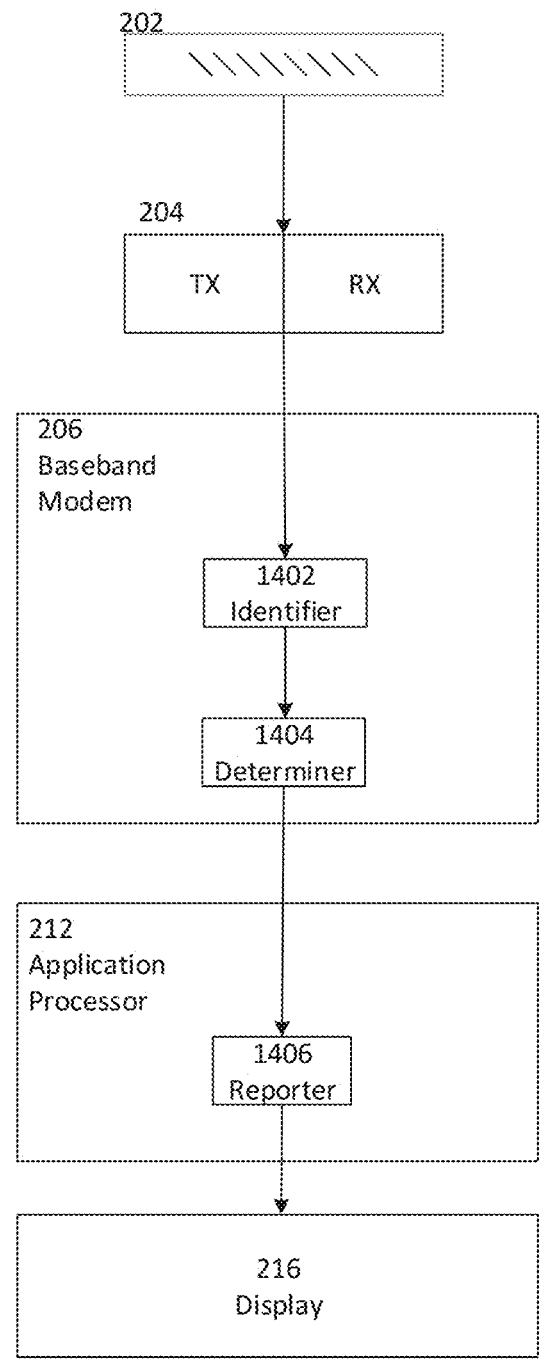
FIG. 14 shows an exemplary circuit configuration of a terminal device in some aspects.

FIG. 14 shows an exemplary circuit configuration 1400 of a terminal device 102 in some aspects. Terminal device 102 may be configured to support dual connectivity, e.g. it may be configured support LTE and 5G NR wireless communications simultaneously.

Identifier 1402 may be configured to identify a first Radio Access Technology (RAT) corresponding to the first network access link and a second RAT corresponding to the second network access link, wherein the first RAT and the second RAT are different. Determiner 1404 may be configured to determine a first RAT Radio Link Control (RLC) leg for the first RAT and a second RAT RLC leg for the second RAT. Reporter 1406 may be configured to report at least the second RAT based on the determined second RAT RLC leg to a user, e.g. via display 216.

While the above descriptions and connected figures may depict electronic device components as separate elements, skilled persons will appreciate the various possibilities to combine or integrate discrete elements into a single element. Such may include combining two or more circuits for form a single circuit, mounting two or more circuits onto a common chip or chassis to form an integrated element, executing discrete software components on a common processor core, etc. Conversely, skilled persons will recognize the possibility to separate a single element into two or more discrete elements, such as splitting a single circuit into two or more separate circuits, separating a chip or chassis into discrete elements originally provided thereon, separating a software component into two or more sections and executing each on a separate processor core, etc. Also, it is appreciated that particular implementations of hardware and/or software components are merely illustrative, and other combinations of hardware and/or software that perform the methods described herein are within the scope of the disclosure.

It is appreciated that implementations of methods detailed herein are exemplary in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

The following examples pertain to further aspects of this disclosure:

In Example 1, a method for a communication device to perform wireless communications, the method including establishing a first network access link with a primary network access node and a second network access link with a secondary network access node; identifying a first Radio Access Technology (RAT) corresponding to the first network access link and a second RAT corresponding to the second network access link; determining a first RAT Radio Link Control (RLC) leg for the first RAT and a second RAT RLC leg for the second RAT; and reporting at least the second RAT based on the determined second RAT RLC leg. The first RAT and the second RAT may be different RATs.

In Example 2, the subject matter of Example(s) 1 may include wherein the first network access link and the second network access link are configured to concurrently and simultaneously communicate data with the primary network access node and the secondary network access node, respectively.

In Example 3, the subject matter of Example(s)-2 may include wherein the first RAT is a Long Term Evolution (LTE) RAT.

In Example 4, the subject matter of Example(s) 3 may include wherein the second RAT is a 5G new radio (NR) RAT.

In Example 5, the subject matter of Example(s) 3 may include wherein the first network access link is an LTE RAT link.

In Example 6, the subject matter of Example(s) 3-5 may include wherein the primary access node is an Evolved Node B (eNodeB).

In Example 7, the subject matter of Example(s) 4-6 may include wherein the second network access link is a 5G NR RAT link.

In Example 8, the subject matter of Example(s) 3-7 may include wherein the secondary network access node is a Next Generation Node B (gNodeB).

In Example 9, the subject matter of Example(s) 1-2 may include wherein the first RAT is a 5G new radio (NR) RAT.

In Example 10, the subject matter of Example(s) 9 may include wherein the second RAT is a Long Term Evolution (LTE) RAT.

In Example 11, the subject matter of Example(s) 9-10 may include wherein the first network access link is an 5G NR RAT link.

In Example 12, the subject matter of Example(s) 9-11 may include wherein the primary access node is a Next Generation Node B (gNodeB).

In Example 13, the subject matter of Example(s) 9—may include wherein the second network access link is a LTE RAT link.

In Example 14, the subject matter of Example(s) 10-13 may include wherein the secondary network access node is an Evolved Node B (eNodeB).

In Example 15, the subject matter of Example(s) 1-14 may include wherein determining the first RAT RLC and for the second RAT RLC leg comprises detecting an active communication of data on the respective RLC leg.

In Example 16, the subject matter of Example(s) 15 may include determining a first type of data on the second RAT RLC leg.

In Example 17, the subject matter of Example(s) 16 may include determining a service associated with the first type of data.

In Example 18, the subject matter of Example(s) 17 may include wherein the determining of the service is performed by obtaining an information from a packet used to communicate the first type of data.

In Example 19, the subject matter of Example(s) 1-18 may include receiving a configuration message, wherein the determining of the first RAT RLC and for the second RAT RLC leg is performed based on the configuration message.

In Example 20, the subject matter of Example(s) 19 may include wherein the configuration message is received from the primary network access node.

In Example 21, the subject matter of Example(s) 20 may include wherein the configuration message is an RRCConnectionReconfiguration message, an RRCReconfiguration message, an RRCResume message, etc. A configuration message which can add, modify, and/or release radio bearers including RLC legs may be considered within the meaning of the configuration message.

In Example 22, the subject matter of Example(s) 1-21 may include reporting of at least the second RAT to the user via a display of the communication device.

In Example 23, a communication device configured for dual connectivity supporting a first network access link and a second network access link, the communication device including an identifier configured to identify a first Radio Access Technology (RAT) corresponding to the first network access link and a second RAT corresponding to the second network access link; a determiner configured to determine a first RAT Radio Link Control (RLC) leg for the first RAT and a second RAT RLC leg for the second RAT; and a reporter configured to report at least the second RAT based on the determined second RAT RLC leg. The first RAT and the second RAT may be different RATs In Example 24, the subject matter of Example(s) 23 may include wherein the first network access link and the second network access link are capable of concurrently communicating data with the primary network access node and the secondary network access node, respectively.

In Example 25, the subject matter of Example(s) 23-24 may include wherein the first RAT is a Long Term Evolution (LTE) RAT.

In Example 26, the subject matter of Example(s) 25 may include wherein the second RAT is a 5G new radio (NR) RAT.

In Example 27, the subject matter of Example(s) 25-26 may include wherein the first network access link is an LTE RAT link.

In Example 28, the subject matter of Example(s) 25-27 may include, wherein the primary access node is an Evolved Node B (eNodeB).

In Example 29, the subject matter of Example(s) 25-28 may include wherein the second network access link is a 5G NR RAT link.

In Example 30, the subject matter of Example(s) 25-29 may include wherein the secondary network access node is a Next Generation Node B (gNodeB).

In Example 31, the subject matter of Example(s) 23-24 may include wherein the first RAT is a 5G new radio (NR) RAT.

In Example 32, the subject matter of Example(s) 31 may include wherein the second RAT is a Long Term Evolution (LTE) RAT.

In Example 33, the subject matter of Example(s) 31-32 may include wherein the first network access link is a 5G NR RAT link.

In Example 34, the subject matter of Example(s) 31-33 may include wherein the primary access node is a Next Generation Node B (gNodeB).

In Example 35, the subject matter of Example(s) 32-34 may include wherein the second network access link is a LTE RAT link.

In Example 36, the subject matter of Example(s) 33-35 may include wherein the secondary network access node is an Evolved Node B (eNodeB).

In Example 37, the subject matter of Example(s) 23-36 may include wherein the determiner is configured determine the first RAT RLC and the second RAT RLC leg by detecting an active communication of data on the respective RLC leg.

In Example 38, the subject matter of Example(s) 37 may include wherein the determiner is configured to determine a first type of data on the second RAT RLC leg.

In Example 39, the subject matter of Example(s) 38 may include wherein the determiner is configured to determine a service associated with the first type of data.

In Example 40, the subject matter of Example(s) 39 may include wherein the determining of the service is performed by obtaining an information from a packet used to communicate the first type of data.

In Example 41, the subject matter of Example(s) 23-40 may include a receiver configured to receive a configuration message, wherein the determining of the first RAT RLC and for the second RAT RLC leg is performed based on the configuration message.

In Example 42, the subject matter of Example(s) 41 may include wherein the configuration message is received from the primary network access node.

In Example 43, the subject matter of Example(s) 42 may include wherein the configuration message is an RRCConnectionReconfiguration message, an RRCReconfiguration message, an RRCResume message, etc. A configuration message which can add, modify, and/or release radio bearers including RLC legs may be considered within the meaning of the configuration message.

In Example 44, the subject matter of Example(s) 23-43 may include the reporter configured to report at least the second RAT to the user via a display of the communication device.

In Example 45, a communication device including one or more processors configured to establish a first network access link with a primary network access node and a second network access link with a secondary network access node; identify a first Radio Access Technology (RAT) corresponding to the first network access link and a second RAT corresponding to the second network access link; determine a first RAT Radio Link Control (RLC) leg for the first RAT and a second RAT RLC leg for the second RAT; and report at least the second RAT based on the determined second RAT RLC leg. The first RAT and the second RAT may be different RATs.

In Example 46, the subject matter of Example 45 may be further configured to perform the method of any one of Examples 2-22.

In Example 47, a communication device including means to establish a first network access link with a primary network access node and a second network access link with a secondary network access node; means to identify a first Radio Access Technology (RAT) corresponding to the first network access link and a second RAT corresponding to the second network access link; means to determine a first RAT Radio Link Control (RLC) leg for the first RAT and a second RAT RLC leg for the second RAT; and means to report at least the second RAT based on the determined second RAT RLC leg. The first RAT and the second RAT may be different RATs.

In Example 48, the subject matter of Example 47 may further include means to perform the method of any one of Examples 2-22.

In Example 49, the subject matter of Example(s) 1-22 may include providing a timer for a respective RLC leg to indicate whether the respective RCL leg is in use.

In Example 50, the subject matter of Example(s) 50 may include upon timer expiry, identifying and determining the activity of the respective RLC leg. For example, this may include wherein the reporting is done based on an expiry condition of the timer, wherein the expiry condition is the activity of the respective RLC leg. This may include timer expiry for the respective RLC leg after the absence of any packets sent/received on the respective RLC leg for the duration of the timer.

In Example 51, the subject matter of Example(s) 50-51 may include linking the timer to a refresh rate of a display of the communication device.

In Example 52, the subject matter of Example(s) 50-52 may include starting the timer upon creation of the respective RLC leg.

In Example 53, the subject matter of Example(s) 50-53 may include restarting the timer each time a packet is sent or received over the respective RLC leg.

In Example 54, the subject matter of Example(s) 50-54 may include upon expiry of timers of the one or more RLC legs associated with a RAT, reporting that the RAT is no longer available.

In Example 55, the subject matter of Example(s) 23-48 may include the determiner configured to implement a timer for each of a respective RLC leg to indicate whether the respective RCL leg is in use.

In Example 56, the subject matter of Example(s) 55 may include upon timer expiry, the determiner configured to identify and determine the activity of the respective RLC leg.

In Example 57, the subject matter of Example(s) 55-56 may include linking the timer to a refresh rate of a display of the communication device.

In Example 58, the subject matter of Example(s) 55-57 may include starting the timer upon creation of the respective RLC leg.

In Example 59, the subject matter of Example(s) 55-58 may include restarting the timer each time a packet is sent or received over the respective RLC leg.

In Example 60, the subject matter of Example(s) 55-59 may include upon expiry of timers of the one or more RLC legs associated with a RAT, reporting that the RAT is no longer available.

In Example 61, one or more non-transitory computer-readable media storing instructions thereon that, when executed by at least one processor of a communication device, direct the communication device to perform the method or realize a device as described in any preceding Example.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A communication device configured for dual connectivity supporting a first network access link with a primary network access node and a second network access link with a secondary network access node, the communication device comprising:
    an identifier configured to identify a first Radio Access Technology (RAT) corresponding to the first network access link and a second RAT corresponding to the second network access link;
    a determiner configured to determine between a first RAT Radio Link Control (RLC) leg for the first RAT and a second RAT RLC leg for the second RAT, determine a first type of data on the second RAT RLC leg based on the determining between the first RAT RLC leg and the second RAT RLC leg, and
    identify a service associated with the first type of data, wherein the identifying of the service is performed by obtaining an information from a packet used to communicate the first type of data; and
    a reporter configured to report at least the second RAT based on the determined second RAT RLC leg.

2. The communication device of claim 1, further configured to concurrently and simultaneously communicate data with the primary network access node and the secondary network access node via the first network access link and the second network access link, respectively, wherein the first RAT and the second RAT are different.

3. The communication device of claim 1, wherein the first RAT is a Long Term Evolution (LTE) RAT.

4. The communication device of claim 1, wherein the second RAT is a 5G new radio (NR) RAT.

5. The communication device of claim 1, wherein the first RAT is a 5G new radio (NR) RAT.

6. The communication device of claim 1, wherein the second RAT is a Long Term Evolution (LTE) RAT.

7. The communication device of claim 1, wherein the determiner is configured to determine between the first RAT RLC and the second RAT RLC leg by detecting an active communication of data on the respective RLC leg.

8. The communication device of claim 1, further comprising a receiver configured to receive a configuration message, wherein the determining between of the first RAT RLC and for the second RAT RLC leg is performed based on the configuration message.

9. The communication device of claim 8, wherein the configuration message is received from the primary network access node.

10. The communication device of claim 9, wherein the configuration message is an RRCConnectionReconfiguration message, an RRCReconfiguration message, or an RRCResume message.

11. The communication device of claim 1, the reporter configured to report at least the second RAT to the user via a display of the communication device.

12. The communication device of claim 1, the reporter further configured to report the determined service.

13. The communication device of claim 1, wherein the first RAT and the second RAT are different.

14. A method for a communication device to perform wireless communications, the method comprising:
- establishing a first network access link with a primary network access node and a second network access link with a secondary network access node, wherein the first network access link and the second network access link are configured to concurrently and simultaneously communicate data with the primary network access node and the secondary network access node, respectively;
- identifying a first Radio Access Technology (RAT) corresponding to the first network access link and a second RAT corresponding to the second network access link;
- determining between a first RAT Radio Link Control (RLC) leg for the first RAT and a second RAT RLC leg for the second RAT;
- based on the determining between the first RAT RLC leg and the second RAT RLC leg, determining a first type of data on the second RAT RLC leg;
- identifying a service associated with the first type of data, wherein the identifying of the service is performed by obtaining an information from a packet used to communicate the first type of data; and
- reporting at least the second RAT based on the determined second RAT RLC leg and reporting the determined service.

15. The method of claim 14, further comprising implementing a timer for each of the first RAT RLC leg and the second RAT RLC leg and restarting the timer for the respective RAT RLC leg each time a packet is sent or received over the respective RAT RLC leg, wherein the reporting is done based on the timer for at least the second RAT RLC leg.

16. The method of claim 15, wherein determining the first RAT RLC leg and the second RAT RLC leg comprises detecting an active communication of data on the respective RAT RLC leg.

17. The method of claim 15, further comprising determining a first type of data on the second RAT RLC leg and determining a service associated with the first type of data.

18. One or more non-transitory computer-readable media storing instructions thereon that, when executed by at least one processor of a communication device, direct the communication device to:
- establish a first network access link with a primary network access node and a second network access link with a secondary network access node;
- identify a first Radio Access Technology (RAT) corresponding to the first network access link and a second RAT corresponding to the second network access link;
- determining between a first RAT Radio Link Control (RLC) leg for the first RAT and a second RAT RLC leg for the second RAT;
- based on the determining between the first RAT RLC leg and the second RAT RLC leg, determining a first type of data on the second RAT RLC leg;
- identifying a service associated with the first type of data, wherein the identifying of the service is performed by obtaining an information from a packet used to communicate the first type of data; and
- reporting at least the second RAT based on the determined second RAT RLC leg and reporting the determined service.

19. The one or more non-transitory computer-readable media of claim 18, wherein determining the first RAT RLC leg and the second RAT RLC leg comprises detecting an active communication of data on the respective RLC leg.

* * * * *